(12) United States Patent
Yamamoto Murakami et al.

(10) Patent No.: US 10,497,197 B2
(45) Date of Patent: Dec. 3, 2019

(54) METHOD AND DEVICE FOR IDENTIFYING USER USING BIO-SIGNAL

(71) Applicant: SAMSUNG ELECTRONICS CO., LTD., Suwon-si (KR)

(72) Inventors: Edwardo Arata Yamamoto Murakami, Osaka (JP); Eijiro Shibusawa, Osaka (JP); Sang-on Choi, Suwon-si (KR); Toshihiro Kitajima, Osaka (JP); Yoshiaki Okuno, Osaka (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/532,376

(22) PCT Filed: Nov. 30, 2015

(86) PCT No.: PCT/KR2015/012890
§ 371 (c)(1),
(2) Date: Jun. 1, 2017

(87) PCT Pub. No.: WO2016/089053
PCT Pub. Date: Jun. 9, 2016

(65) Prior Publication Data
US 2017/0330400 A1    Nov. 16, 2017

(30) Foreign Application Priority Data

Dec. 2, 2014   (JP) ................................. 2014-243736
Nov. 25, 2015  (KR) ........................ 10-2015-0165569

(51) Int. Cl.
*G07C 9/00* (2006.01)
*G06F 21/32* (2013.01)
(Continued)

(52) U.S. Cl.
CPC ......... *G07C 9/00158* (2013.01); *G06F 21/32* (2013.01); *G10L 17/10* (2013.01); *G07C 9/00* (2013.01); *G10L 17/00* (2013.01)

(58) Field of Classification Search
CPC ....... G07C 9/00158; G07C 9/00; G06F 21/32; G10L 17/10; G10L 17/00
(Continued)

(56) References Cited

U.S. PATENT DOCUMENTS

| 7,245,960 B2 | 7/2007 | Yasushi et al. |
| 2006/0059364 A1 | 3/2006 | Fontijn |

(Continued)

FOREIGN PATENT DOCUMENTS

| CN | 103294986 A | 9/2013 |
| JP | 2001-000422 A | 1/2001 |

(Continued)

OTHER PUBLICATIONS

Communication dated Sep. 3, 2019 issued by the State Intellectual Property Office of P.R. China in counterpart Chinese Application No. 201580065333.5.*

(Continued)

*Primary Examiner* — Edwin C Holloway, III
(74) *Attorney, Agent, or Firm* — Sughrue Mion, PLLC

(57) ABSTRACT

Provided is a user identifying method using a bio-signal, the method including sensing a user input; detecting a bio-signal from the sensed user input; determining whether the detected bio-signal is valid, based on status information representing a status of a user at a moment when the user input is sensed; and identifying the user by comparing the bio-signal with at least one pre-stored reference bio-signal, according to a result of the comparing.

19 Claims, 24 Drawing Sheets

(51) Int. Cl.
*G10L 17/10* (2013.01)
*G10L 17/00* (2013.01)

(58) Field of Classification Search
USPC .................................................... 340/5.82
See application file for complete search history.

(56) References Cited

U.S. PATENT DOCUMENTS

| | | | |
|---|---|---|---|
| 2007/0014443 A1* | 1/2007 | Russo | G06K 9/00114 382/124 |
| 2010/0014720 A1* | 1/2010 | Hoyos | G06K 9/00107 382/118 |
| 2010/0045787 A1 | 2/2010 | Uno | |
| 2010/0054547 A1 | 3/2010 | Tagscherer | |
| 2010/0306550 A1* | 12/2010 | Kevenaar | G06F 21/32 713/186 |
| 2011/0150291 A1 | 6/2011 | Jung | |
| 2011/0199184 A1* | 8/2011 | Hachisuka | B60R 25/00 340/5.64 |
| 2012/0007713 A1* | 1/2012 | Nasiri | G06F 1/1694 340/5.81 |
| 2012/0068820 A1* | 3/2012 | Mollicone | G06F 21/00 340/5.82 |
| 2013/0015952 A1 | 1/2013 | Menczel et al. | |
| 2013/0176108 A1* | 7/2013 | Madhani | G06F 21/32 340/5.82 |
| 2014/0012146 A1 | 1/2014 | Fukuda | |
| 2014/0089673 A1 | 3/2014 | Luna | |
| 2016/0007935 A1* | 1/2016 | Hernandez | A61B 5/7278 600/301 |
| 2016/0142407 A1* | 5/2016 | Chun | H04L 63/0861 726/5 |

FOREIGN PATENT DOCUMENTS

| | | |
|---|---|---|
| JP | 2006-043146 A | 2/2006 |
| JP | 2006-218033 A | 8/2006 |
| JP | 2007-213196 A | 8/2007 |
| JP | 3980969 B2 | 9/2007 |
| JP | 2009-261419 A | 11/2009 |
| JP | 2011-175587 A | 9/2011 |
| JP | 2014-12072 A | 1/2014 |
| WO | 2009/048299 A2 | 4/2009 |

OTHER PUBLICATIONS

International Search Report (PCT/ISA/210) dated Mar. 15, 2016 issued by the International Searching Authority in counterpart International Application No. PCT/KR2015/012890.
Written Opinion (PCT/ISA/237) dated Mar. 15, 2016 issued by the International Searching Authority in counterpart International Application No. PCT/KR2015/012890.
Communication dated Sep. 11, 2018 issued by the Japanese Patent Office in counterpart Japanese Application No. 2014-243736.

* cited by examiner

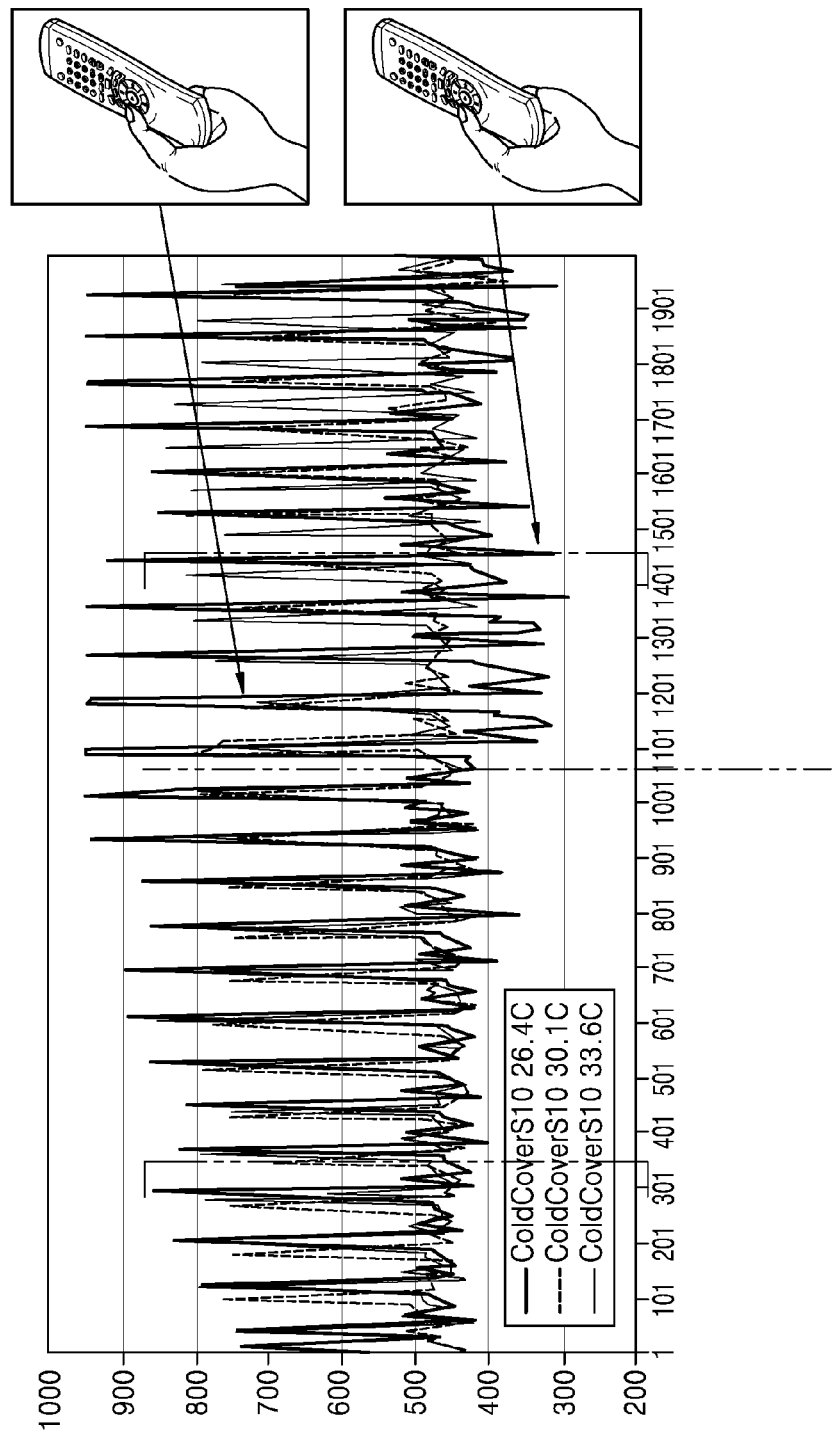

METHOD AND DEVICE FOR IDENTIFYING USER USING BIO-SIGNAL

TECHNICAL FIELD

The present invention relates to a method of identifying a user by using a bio-signal, an apparatus for identifying a user by using a bio-signal, and a computer-readable recording medium having recorded thereon a program for executing the method of identifying a user by using a bio-signal.

BACKGROUND ART

Technology for identifying a user has been recently used not only in personal portable terminals, such as tablet personal computers (PCs) or smartphones but also in audiovisual (AV) apparatuses, such as televisions (TVs) and video recorders. For example, AV apparatuses may provide a service suitable to a user's taste by, for example, suggesting a broadcasting program in a genre preferred by the user or suggesting a program in which an actor or actress preferred by the user appears.

In general, user identification is conducted by a user selecting his/her identity information by manipulating a screen tab or button. In order to prevent people other than the user from utilizing the identity information of the user, the user may be required to input a password. As such, general user identification reduces user convenience by forcing a user to manipulate a screen tab or button and furthermore to input a password. Accordingly, apparatuses having a biometric authentication function have been developed to reduce a load on a user during user identification.

For biometric authentication, a bio matrix, such as a fingerprint, an iris, or a vein pattern, may be generally used. Moreover, user identification apparatuses using a pulse wave signal as a bio-signal have been recently developed. The pulse wave signal is a periodic signal that represents the pulsatory motion of blood ejected from a heart. Identifying the pulse wave signal of each individual is possible. The user identification apparatuses using a pulse wave signal may be manufactured at low cost, compared with user identification apparatuses using other bio matrices, and are thus being installed in various consumer apparatuses.

DETAILED DESCRIPTION OF THE INVENTION

Technical Problem

The present invention provides a method and apparatus for identifying a user according to a pulse wave signal of the user, which is detected during typical activity of the user without requiring the user to be in a stable state.

Technical Solution

According to an aspect of the present invention, there is provided a user identifying method using a bio-signal, the user identifying method including sensing a user input; detecting a bio-signal from the sensed user input; determining whether the detected bio-signal is valid, based on status information representing a status of a user at a moment when the user input is sensed; and identifying the user by comparing the bio-signal with at least one pre-stored reference bio-signal, according to a result of the comparing.

DESCRIPTION OF THE DRAWINGS

FIG. 4 is a graph view for explaining a variation in a pulse wave signal of a user according to a body temperature of the user.

MODE OF THE INVENTION

Figure 1:
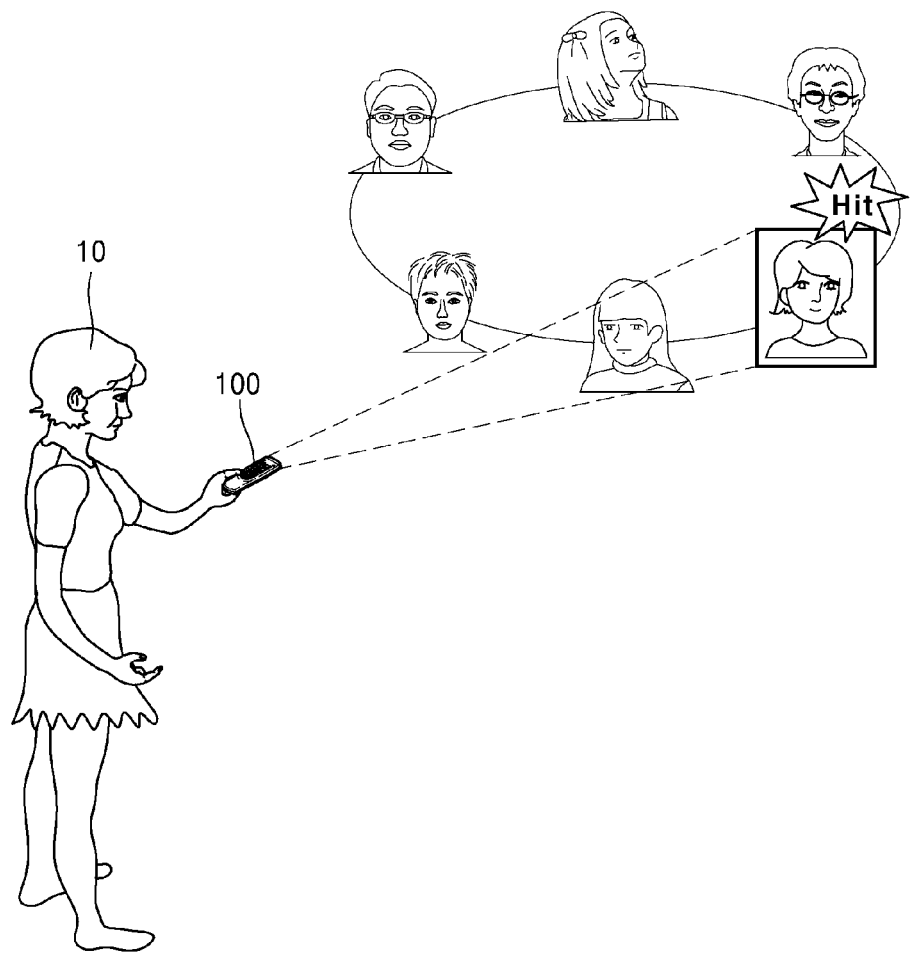
FIG. 1 is a view for explaining a method of identifying a user by using a bio-signal, according to an embodiment.

A user identifying method using a bio-signal, according to an embodiment, includes sensing a user input; detecting a bio-signal from the sensed user input; determining whether the detected bio-signal is valid, based on status information representing a status of a user at a moment when the user input is sensed; and identifying the user by comparing the bio-signal with at least one pre-stored reference bio-signal, according to a result of the comparing.

The bio-signal includes a pulse wave signal, and the status information of the user includes at least one of a body temperature of the user, a pressure generated by the user input, and a posture and a motion of the user.

The determining includes determining whether the status information of the user corresponds to a preset detection criterion.

The at least one reference bio-signal is classified into at least one group and stored, according to characteristics of the at least one reference bio-signal, the identifying of the user comprises identifying a group corresponding to the bio-signal of the user from among the classified at least one group, and the user identifying method further includes displaying information about the identified group.

The identifying of the user includes comparing a reference bio-signal included in the identified group with the bio-signal of the user.

The user identifying method further includes obtaining service use information of the identified group from service use information of the at least one group that represents history information of a service previously executed by a user included in the at least one group; and providing a service based on the obtained service use information.

The user identifying method further includes creating a normal bio-signal space that represents characteristics of the at least one reference bio-signal based on vector information of the at least one reference bio-signal. The determining includes determining whether the bio-signal is valid, based on a degree to which the bio-signal is deformed as the bio-signal is projected to the normal bio-signal space.

The user identifying method further includes, when the degree to which the bio-signal is deformed is within a preset range, correcting the bio-signal.

The user identifying method further includes storing the detected bio-signal in a database when the at least one pre-stored reference bio-signal does not include a reference bio-signal corresponding to the detected bio-signal.

A user identifying apparatus using a bio-signal, according to an embodiment, includes a sensor configured to sense a user input; a detector configured to detect a bio-signal from the sensed user input; and a controller configured to determine whether the detected bio-signal is valid, based on status information representing a status of a user at a moment when the user input is sensed, and to identify the user by comparing the bio-signal with at least one pre-stored reference bio-signal, according to a result of the comparing.

The bio-signal includes a pulse wave signal, and the status information of the user includes at least one of the body temperature of the user, a pressure applied to the user identifying apparatus by the user input, and a posture and a motion of the user.

The controller determines whether the status information of the user corresponds to a preset detection criterion.

The at least one reference bio-signal is classified into at least one group and stored, according to characteristics of the at least one reference bio-signal, the controller identifies a group corresponding to the bio-signal of the user from among the classified at least one group, and the user identifying apparatus further includes an output unit configured to display information about the identified group.

The controller compares a reference bio-signal included in the identified group with the bio-signal of the user.

The user identifying apparatus further includes a service provider configured to obtain service use information of the identified group from among pre-stored service use information of the at least one group and to provide a service based on the obtained service use information.

The user identifying apparatus further includes a service provider configured to obtain service use information of the identified user from among the pre-stored service use information and to provide a service based on the obtained service use information.

The controller creates a normal bio-signal space that represents characteristics of the at least one reference bio-signal based on vector information of the at least one reference bio-signal, and determines whether the bio-signal is valid, based on a degree to which the bio-signal is deformed as the bio-signal is projected to the normal bio-signal space.

When a degree to which the bio-signal is deformed is within a preset range, the controller corrects the bio-signal.

When the pre-stored reference bio-signal does not include a reference bio-signal corresponding to the detected bio-signal, the controller stores the detected bio-signal in a database.

MODE OF THE INVENTION

Embodiments of the present invention are described in detail herein with reference to the accompanying drawings so that this disclosure may be easily performed by one of ordinary skill in the art to which the present invention pertain. The present invention may, however, be embodied in many different forms and should not be construed as being limited to the embodiments set forth herein. In the drawings, parts irrelevant to the description are omitted for simplicity of explanation, and like numbers refer to like elements throughout.

Throughout the disclosure, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Throughout the disclosure, a bio-signal is referred to as information about a signal generated by the body of a user. For example, the bio-signal may include the pulse waves, heartbeat, fingerprint, voice print, blood pressure, nictation, electroencephalogram, electrocardiogram, phonocardiogram, electro-oculogram, electromyogram, and body temperature of the user. However, this is only an embodiment, and bio-information according to the present invention is not limited thereto.

The present disclosure will now be described more fully with reference to the accompanying drawings, in which exemplary embodiments of the present disclosure are shown.

FIG. 1 is a view for explaining a method of identifying a user 10 by using a bio-signal, according to an embodiment.

A user identifying apparatus 100 using a bio-signal according to an embodiment (hereinafter, referred to as a user identifying apparatus 100) may identify the user 10 by detecting a bio-signal of the user 10. The user identifying apparatus 100 may detect the bio-signal from a sensed user input. For example, when the user 10 is touching or holding the user identifying apparatus 100, the user identifying apparatus 100 may detect the bio-signal from a finger of the user 10. However, this is only an embodiment, and the type of the user input is not limited thereto. According to another embodiment, the user identifying apparatus 100 may detect the bio-signal from a drag input of dragging in one direction while the user 10 is touching the user identifying apparatus 100.

The user identifying apparatus 100 according to an embodiment may previously store information about the bio-signal of at least one user. For example, the user identifying apparatus 100 may store a bio-signal previously detected from at least one user (for example, the user 10). According to another embodiment, the user identifying apparatus 100 may store a bio-signal obtained from at least one user (for example, the user 10) via a user interface capable of registering a bio-signal.

The user identifying apparatus 100 according to an embodiment may identify the user 10 by comparing the detected bio-signal of the user 10 with the previously-stored bio-signal of the at least one user. The bio-signal of the at least one user previously stored in the user identifying apparatus 100 will now be described as a reference bio-signal.

To increase the accuracy of identification, the user identifying apparatus 100 may determine whether the detected bio-signal is valid, before identifying the user 10. For example, based on status information, such as, a body temperature and a posture, of the user at the moment when the user input is sensed, the user identifying apparatus 100 may determine whether the bio-signal is valid. According to another embodiment, the user identifying apparatus 100 may determine a similarity between characteristics of the pre-stored bio-signal and those of the detected bio-signal, thereby determining whether the detected bio-signal is valid.

When a portion of the detected bio-signal has an error, the user identifying apparatus 100 according to an embodiment may correct the detected bio-signal.

The user identifying apparatus 100 according to an embodiment may store history information about service uses of the at least one user, together with the information about the bio-signal of the at least one user. The history information may include information about services received by each of the at least one user by using the user identifying apparatus 100. For example, when the user identifying apparatus 100 is a remote controller, channel information of a TV controlled by the user 10 via the remote controller may be included in the history information.

When the user identifying apparatus 100 according to an embodiment has identified the user 10, the user identifying apparatus 100 may provide information about services highly likely to be conducted by the user 10, based on the history information about the user 10. For example, when the user identifying apparatus 100 is a remote controller, the user identifying apparatus 100 may control a TV to display information about TV channels frequently watched by a user.

The user identifying apparatus 100 may be, but is not limited to, at least one of a remote controller, a smartphone, a tablet personal computer (PC), a PC, and a wearable user identifying apparatus.

Figure 2:
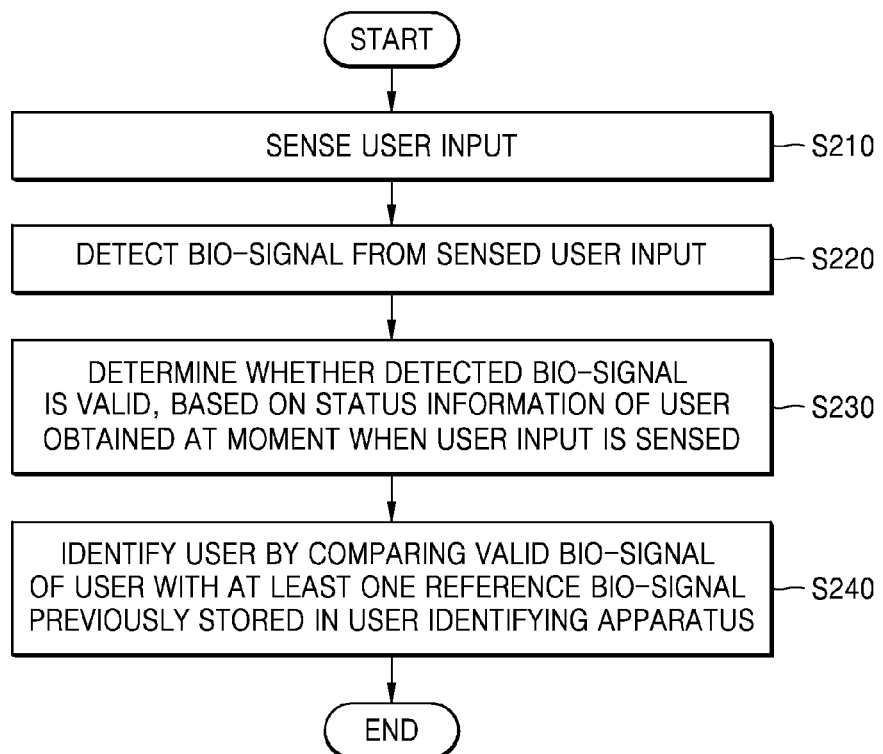
FIG. 2 is a flowchart of a method in which a user identifying apparatus according to an embodiment identifies a user by using a bio-signal of the user.

FIG. 2 is a flowchart of a method in which the user identifying apparatus 100 according to an embodiment identifies a user by using a bio-signal of the user.

In operation S210, the user identifying apparatus 100 senses a user input. The user input may be created by a part of the body of the user contacting the user identifying apparatus. For example, when the user 10 is touching or holding the user identifying apparatus 100, the user identifying apparatus 100 may detect the bio-signal from a finger of the user 10. According to another example, the user identifying apparatus 100 may detect the bio-signal from a drag input of the user 10.

In operation S220, the user identifying apparatus 100 detects the bio-signal from the sensed user input.

The user identifying apparatus 100 may detect the bio-signal of the user from the sensed user input. For example, when the user holds the user identifying apparatus on his or her hand and manipulates the user identifying apparatus, the user identifying apparatus 100 may detect the bio-signal from an index finger of the user. The detected bio-signal may be a pulse wave signal.

In operation S230, the user identifying apparatus 100 determines whether the detected bio-signal is valid, based on status information of the user obtained at the moment when the user input of the user 10 is sensed.

The user identifying apparatus 100 may obtain the status information of the user 10 at the moment when the user input of the user 10 is sensed. The status information may include at least one of the body temperature of the user 10, a pressure generated by the user identifying apparatus 100 according to the user input (hereinafter, referred to as a pushing pressure), and a posture and a motion of the user 10.

For example, the user identifying apparatus 100 may obtain the status information about the motion and posture of the user by using at least one of a tactile sensor, an acceleration sensor, an angular velocity sensor, and a direction sensor included in the user identifying apparatus 100. According to another embodiment, the user identifying apparatus 100 may obtain the status information about the body temperature and pushing pressure of the user by using a temperature sensor and a pressure sensor included in the user identifying apparatus 100.

However, this is only an embodiment, and the status information of the user 10 is not limited thereto. According to another embodiment, the status information of the user 10 may include at least a portion of the bio-signal detected by the user identifying apparatus 100.

The user identifying apparatus 100 according to an embodiment may determine whether the detected bio-signal is valid, based on the obtained status information. For example, the user identifying apparatus 100 may determine whether the status information about the motion and posture of the user obtained at the moment when the user input is sensed corresponds to a preset detection criterion.

When the bio-signal of the user is detected when the user has deviated from a posture and a motion within a reference range, the magnitude of the bio-signal is small or a Signal to Noise Ratio (SNR) value of the bio-signal is decreased, and thus the accuracy of a result of the user identification by the user identifying apparatus 100 may be lowered. Accordingly, the user identifying apparatus 100 according to an embodiment may determine whether a status of the user 10 at the moment when the user input is sensed corresponds to the preset detection standard, to thereby determine whether the detected bio-signal is valid.

According to another embodiment, the user identifying apparatus 100 may determine whether the detected bio-signal is valid, based on a pre-stored reference bio-signal. For example, the user identifying apparatus 100 may create a normal bio-signal space that represents the characteristics of the pre-stored reference bio-signal, by using a vector component of the pre-stored reference bio-signal. The user identifying apparatus 100 may determine whether the detected bio-signal is valid, by projecting the detected bio-signal to the created normal bio-signal space.

In operation S240, the user identifying apparatus 100 identifies the user by comparing the bio-signal of the user 10 determined to be valid with at least one reference bio-signal previously stored in the user identifying apparatus 100.

When it is determined that the detected bio-signal is valid, the user identifying apparatus 100 according to an embodiment may compare the detected bio-signal with the at least one reference bio-signal previously stored in the user identifying apparatus 100. For example, the user identifying apparatus 100 may compare feature values, such as a waveform and a peak point, of the bio-signal with those of a reference bio-signal. However, this is only an embodiment, and features of the detected bio-signal and the reference bio-signal which are to be compared with each other are not limited to just the waveform and the peak point.

When the degree of an error to the detected bio-signal is within a preset range as a result of the determination as to whether the detected bio-signal is valid, the user identifying apparatus 100 according to an embodiment may correct the detected bio-signal. The user identifying apparatus 100 may identify the user 10 by comparing the corrected bio-signal with the previously-stored at least one reference bio-signal.

Figure 3A:
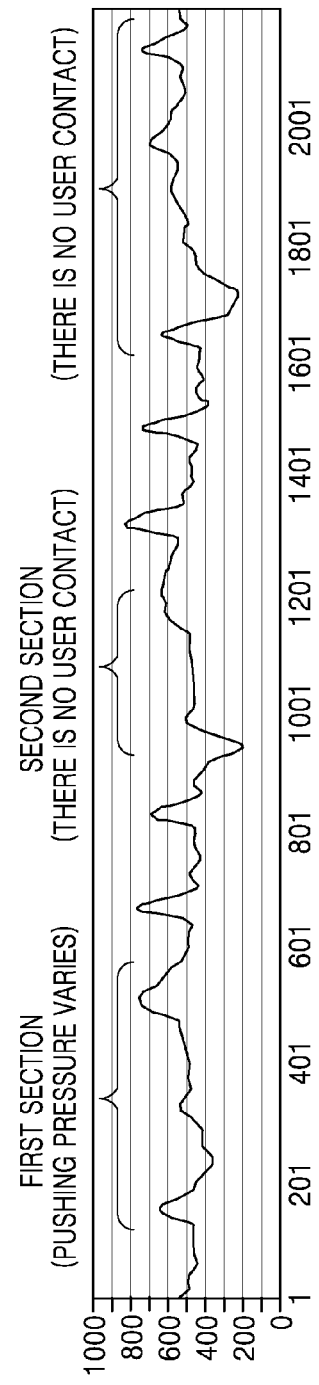
FIGS. 3A and 3B are graphs for explaining a variation in a pulse wave signal of a user according to a motion of the user.
Figure 3B:
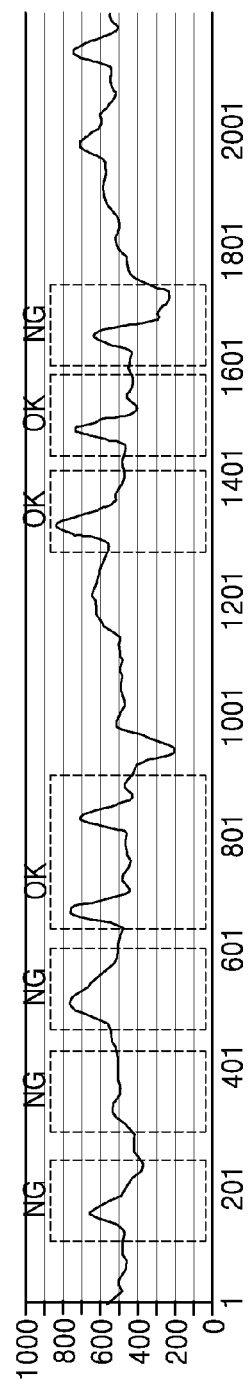

FIGS. 3A and 3B are graphs for explaining a variation in a pulse wave signal of a user according to an action of the user.

Referring to FIG. 3A, a first section indicates a section in which a pushing pressure applied from a finger of the user 10 to the user identifying apparatus 100 varies. In the first section, the magnitude and the waveform of a pulse wave signal detected by the user identifying apparatus 100 vary according to a change in the pushing pressure.

In FIG. 3A, a second section indicates a case where a finger of the user 10 does not contact the user identifying apparatus.

In FIG. 3A, a third section indicates a section in which the user moves. In the third section, the magnitude and the waveform of the pulse wave signal detected by the user identifying apparatus 100 vary according to a motion of the user.

Referring to FIG. 3B, the user identifying apparatus 100 according to an embodiment may determine, as a valid pulse wave signal, a pulse wave signal of a section in which the status information of the user corresponds to a detection criterion from among the pulse wave signals of the first and third sections in which respective user inputs have been sensed. The user identifying apparatus 100 may obtain status information about the posture, motion, and pushing pressure of the user by using at least one of a gyroscopic sensor, an acceleration sensor, a digital compass, a temperature sensor, and a force sensor included in the user identifying apparatus 100. The user identifying apparatus 100 may determine the valid pulse wave signal from among the detected pulse wave signals by determining whether the obtained status information of the user corresponds to the detection criterion.

The user identifying apparatus 100 according to an embodiment may identify the user 10 by selecting the valid pulse wave signal from among the detected pulse wave signals, thereby identifying the user 10 even when a contact of the user 10 is temporarily stopped while a user input is being sensed or when the waveform of a pulse wave signal is in disorder. Even when a pulse wave signal fails to be continuously detected from a user input, the user identifying apparatus 100 according to an embodiment integrates the valid pulse wave signal to thereby increase the accuracy of user identification.

FIG. 4 is a graph view for explaining a variation in a pulse wave signal of a user according to a body temperature of the user.

Referring to FIG. 4, the magnitude, the waveform, and the period of a pulse wave signal detected by the user identifying apparatus 100 vary as the body temperature of the user changes.

The user identifying apparatus 100 according to an embodiment may determine whether the body temperature of the user is suitable to detect a valid pulse wave signal. Thus, according to a result of the determination, the user identifying apparatus 100 may determine the validity of the detected pulse wave signal. For example, the user identifying apparatus 100 may determine the validity of the detected pulse wave signal by determining whether a measured body temperature of the user 10 corresponds to a preset detection criterion.

Figure 5A:
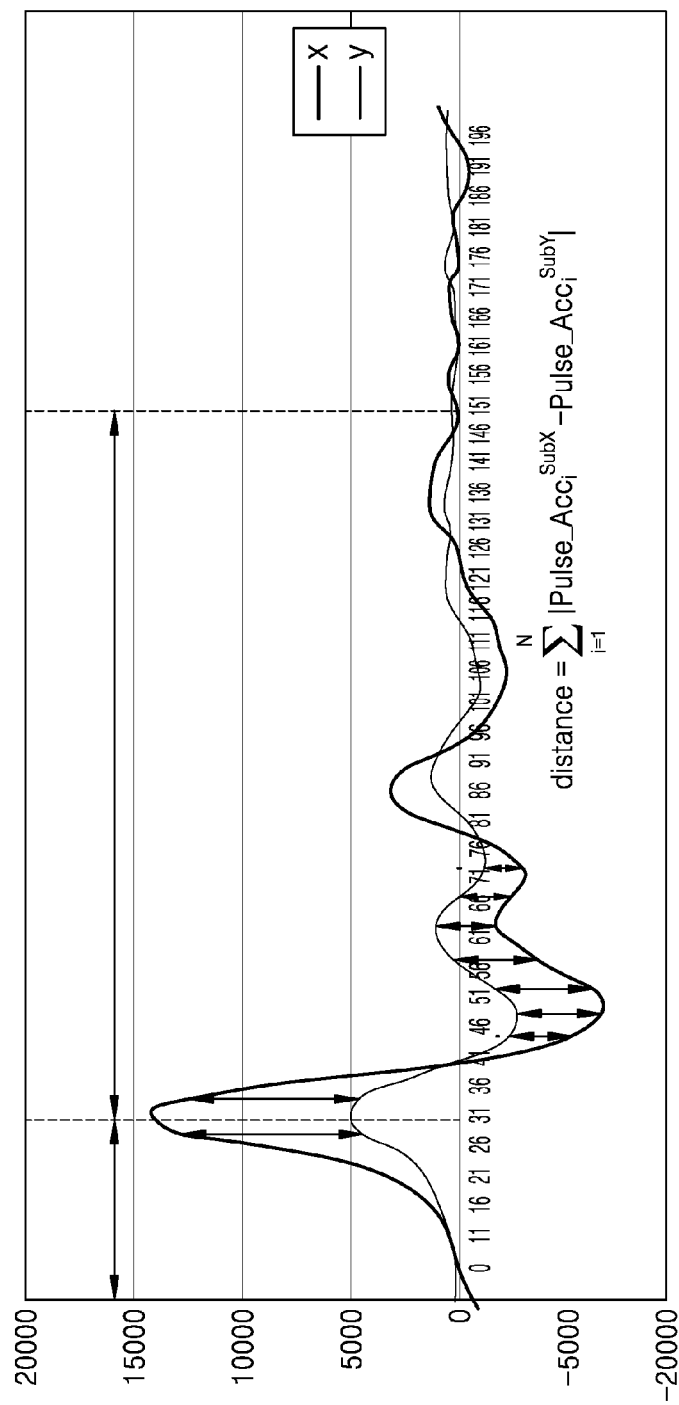
FIGS. 5A and 5B are graphs for explaining a feature amount of a pulse wave signal that is used in user identification by a user identifying apparatus according to an embodiment.
Figure 5B:
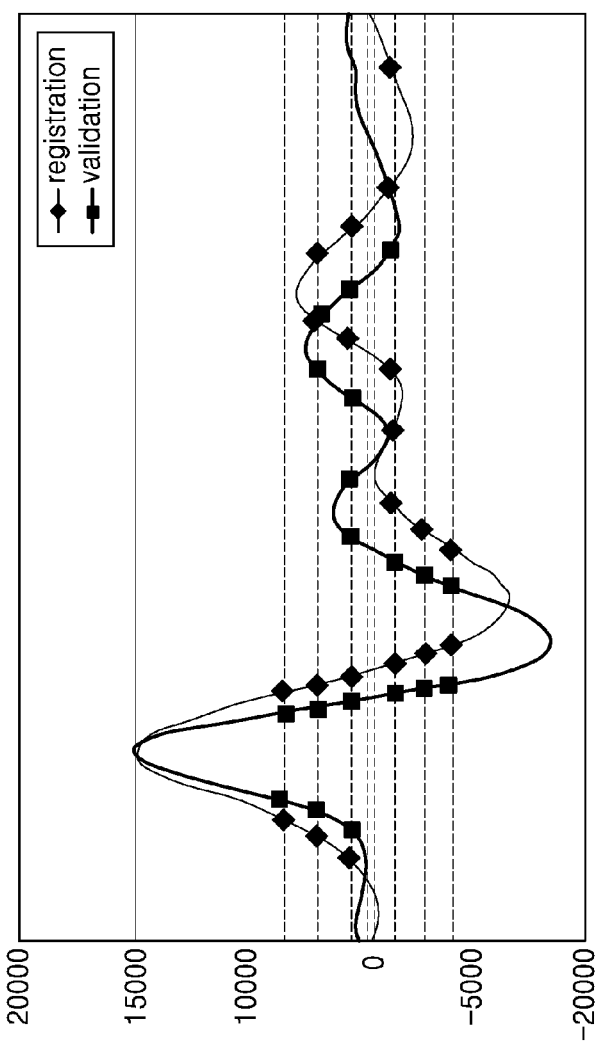

FIGS. 5A and 5B are graphs for explaining a feature amount of a pulse wave signal that is used in user identification by the user identifying apparatus 100 according to an embodiment.

Referring to FIG. 5A, the user identifying apparatus 100 may determine the magnitudes of peaks for a volume pulse wave, a velocity pulse wave, and an acceleration pulse wave from the detected pulse wave signal. The user identifying apparatus 100 may identify a user by comparing the determined magnitudes of the summits with the magnitude of a summit of a pulse wave signal of at least one user previously stored in the user identifying apparatus.

Referring to FIG. 5B, the user identifying apparatus 100 may determine variations in the waveform and the magnitude of the detected pulse wave signal over time. The user identifying apparatus 100 may identify a user by comparing the determined variations in the detected pulse wave signal over time with a variation in the pulse wave signal of the at least one user previously stored in the user identifying apparatus 100 over time.

Figure 6:
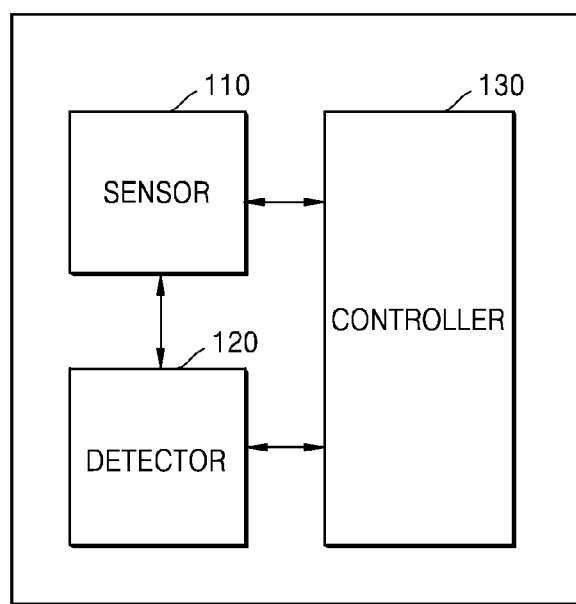
FIGS. 6 and 7 are block diagrams of a user identifying apparatus according to an embodiment.
Figure 7:
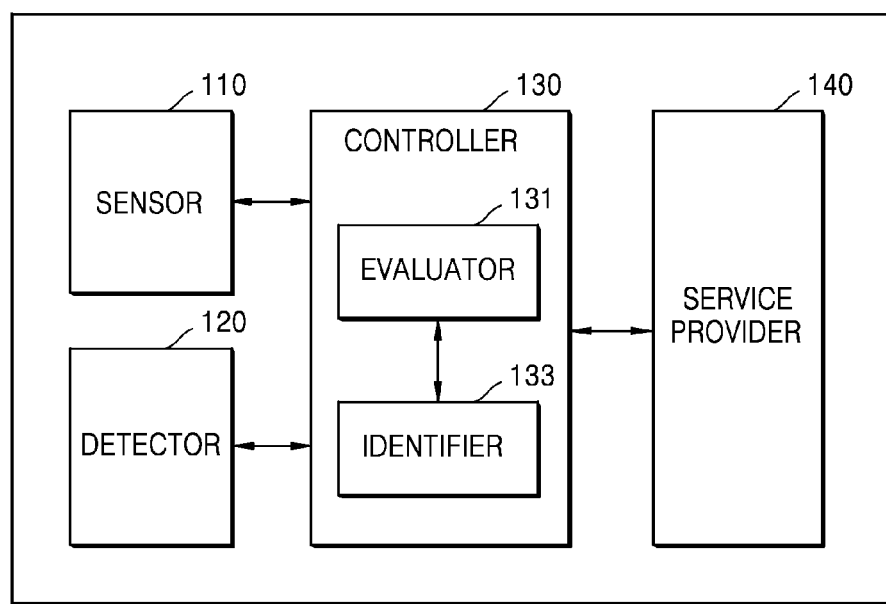

FIGS. 6 and 7 are block diagrams of the user identifying apparatus 100 according to an embodiment.

Referring to FIG. 6, the user identifying apparatus 100 may include a sensor 110, a detector 120, and a controller 130. However, all of the illustrated components are not essential. The user identifying apparatus 100 may be implemented by more or less components than those illustrated in FIGS. 6 and 7.

For example, referring to FIG. 7, the user identifying apparatus 100 according to an embodiment may further include a service provider 140 and a memory (not shown) in addition to the sensor 110, the detector 120, and the controller 130.

The aforementioned components will now be described in detail.

The sensor 110 senses a user input. The user input may be created by a part of the body of a user contacting the user identifying apparatus 100. For example, the sensor 110 may sense a touch input created when the user touches the user identifying apparatus 100 by using his or her finger. The sensor 110 according to an embodiment may obtain status information including at least one of the body temperature, the pushing pressure, the posture, and the motion of the user.

The sensor 110 may include, but is not limited to, at least one selected from a magnetic sensor, an acceleration sensor, a temperature/humidity sensor, an infrared sensor, a gyroscope sensor, a position sensor (e.g., a global positioning system (GPS)), a pressure sensor, a proximity sensor, and an RGB sensor (i.e., an illuminance sensor), a digital compass, and a pulse wave sensor. Functions of most of the sensors would be instinctively understood by one of ordinary skill in the art in view of their names and thus detailed descriptions thereof will be omitted herein.

The detector 120 detects a bio-signal of the user from the sensed user input. For example, the detector 120 may detect a pulse wave signal of the user from a touch input or drag input of the user.

The controller 130 typically controls all operations of the user identifying apparatus 100. For example, the controller 130 may control the sensor 110, the detector 120, and the service provider 140, and the like by executing the programs stored in the memory (not shown).

The controller 130 determines whether the detected bio-signal is valid, based on status information of the user obtained at the moment when the user input is sensed. The controller 130 identifies the user by comparing the bio-signal of the user determined to be valid with at least one reference bio-signal previously stored in the user identifying apparatus.

The controller 130 according to an embodiment may include an evaluator 131 and an identifier 133.

The evaluator 131 may determine whether the detected bio-signal is valid.

The evaluator 131 according to an embodiment may determine whether the status information of the user corresponds to a preset detection criterion. For example, the evaluator 131 may determine whether a body temperature, a pushing pressure, a posture, and a motion of the user at the moment when the bio-signal of the user has been detected correspond to a body temperature, a pushing pressure, a posture, and a motion corresponding to the preset detection criterion. When the evaluator 131 determines that the status information of the user corresponds to the preset detection criterion, the evaluator 131 may determine that the detected pulse wave signal is valid.

According to another embodiment, the evaluator 131 may determine whether the detected bio-signal is valid, based on a pre-stored reference bio-signal. For example, the evaluator 131 may create a normal bio-signal space by using a vector component of the pre-stored reference bio-signal. The evaluator 131 projects the detected bio-signal to the created normal bio-signal space. The evaluator 131 may determine whether the detected bio-signal is valid, based on the degree of deformation of the bio-signal according to a result of projecting the detected bio-signal to the normal bio-signal space.

The evaluator 131 according to an embodiment may select a portion of the detected bio-signal that is determined to be valid. According to another embodiment, when it is not determined that the detected bio-signal is valid, the evaluator 131 may correct the detected bio-signal.

When it is determined that the detected bio-signal is valid, the identifier 133 may compare the detected bio-signal with the at least one reference bio-signal previously stored in the user identifying apparatus 100. For example, the identifier 133 may compare feature values of the bio-signal, such as a waveform and a peak point thereof, with those of the reference bio-signal.

The identifier 133 may determine a user corresponding to a reference bio-signal that is the most similar to the detected bio-signal, as a user of the detected bio-signal, based on a result of the comparison.

The service provider 140 may provide a service highly likely to be executed by the user to the user, based on history information about the user identified by the controller 130. For example, when the user identifying apparatus 100 is a remote controller, the service provider 140 may control a TV to display information about TV channels frequently watched by the user.

The service provider 140 according to an embodiment may include a communicator and an output unit.

The communicator may communicate with another user identifying apparatus capable of providing the service highly likely to be executed by the user or information about the service. The communicator may include at least one of a short-range communicator, a mobile communicator, and a broadcasting receiver.

The output unit outputs an audio signal, a video signal, or a vibration signal, and may include a display, an audio output unit, and a vibration motor.

Figure 8:
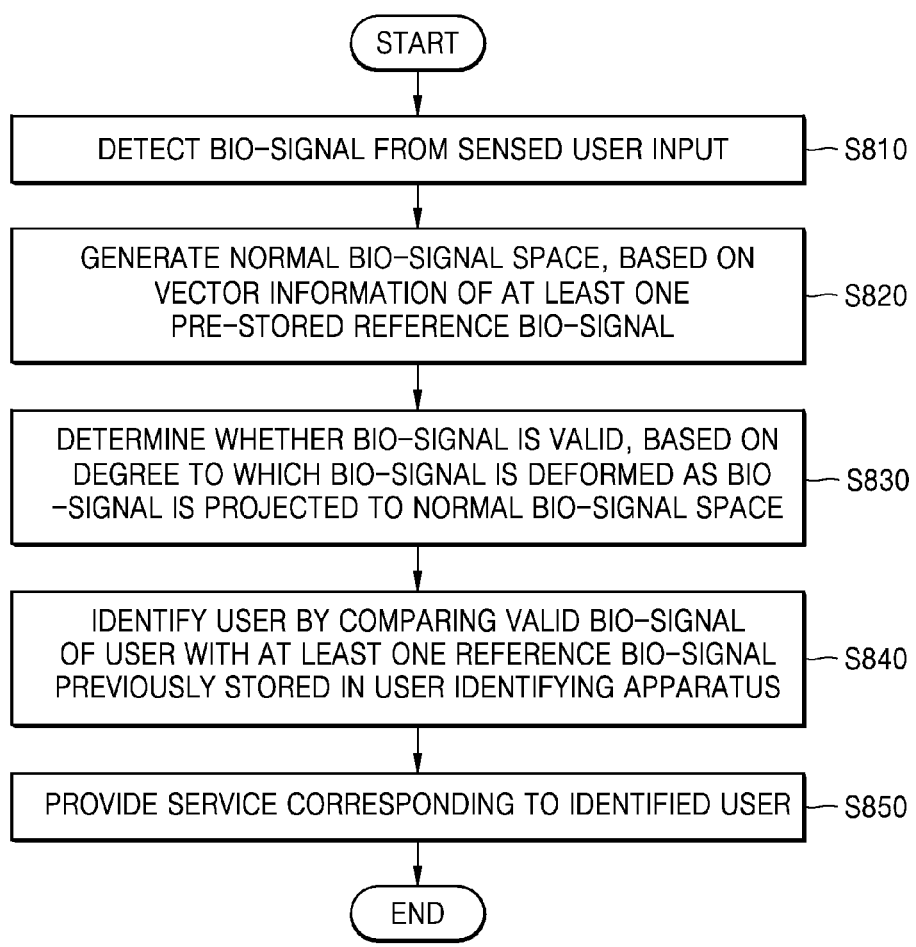
FIG. 8 is a flowchart of a method in which the user identifying apparatus according to an embodiment determines whether the detected bio-signal is valid, by using the pre-stored reference bio-signal.

FIG. 8 is a flowchart of a method in which the user identifying apparatus according to an embodiment determines whether a detected bio-signal is valid, by using a pre-stored reference bio-signal.

In operation S810, the user identifying apparatus may detect a bio-signal from a user input sensed by the user identifying apparatus.

Operation S810 may correspond to operation S220 described above with reference to FIG. 2.

In operation S820, the user identifying apparatus may generate a normal bio-signal space, based on vector information of at least one pre-stored reference bio-signal.

The user identifying apparatus according to an embodiment may read from memory at least one reference bio-signal that is usable in user identification. The user identifying apparatus may generate the normal bio-signal space by using the at least one reference bio-signal. When the detected bio-signal is valid, the detected bio-signal may be expressed as a primary combination of an orthonormal basis of the normal bio-signal space.

In operation S830, the user identifying apparatus may determine whether the bio-signal is valid, based on the degree to which the bio-signal is deformed as the bio-signal is projected to the normal bio-signal space.

The user identifying apparatus according to an embodiment may determine whether the detected bio-signal is valid, by using whether the detected bio-signal may be expressed as a primary combination of the orthonormal basis of the normal bio-signal space.

For example, the user identifying apparatus may calculate the value of a loss function L(x) for a detected bio-signal x by using Equation 1 below. The loss function is a function that evaluates similarity of the bio-signal. As a bio-signal which is a target of user identification is similar to a reference bio-signal, the value of the loss function may decrease.

$$L(x) = 1 - \frac{X^T U U^T X}{X^T X} \qquad \text{[Equation 1]}$$

In Equation 1, U indicates an orthonormal basis that represents a partial space of a normal bio-signal space. U may be expressed as a unique vector corresponding to N unique values having high efficiency matrices calculated from the pre-stored reference bio-signal.

When the value of a loss function for the detected bio-signal is less than a threshold value, the user identifying apparatus according to an embodiment may determine that the detected bio-signal is valid.

In operation S840, the user identifying apparatus may identify the user by comparing the bio-signal of the user determined to be valid with at least one reference bio-signal previously stored in the user identifying apparatus.

The user identifying apparatus according to an embodiment may identify the user by using the bio-signal determined to be valid. For example, the user identifying apparatus may identify the user by using an independent component analysis or main component analysis technique for the peak waveform of the valid bio-signal. However, this is only an embodiment, and the user identifying apparatus may identify the user based on the valid bio-signal, by using at least one of Support Vector Machine (SVM), Linear Discriminant Analysis (LDA), K-Nearest Neighbor (KNN), and Mutual Subspace Method (MSM).

The reference bio-signal according to an embodiment may be an acceleration waveform of the pulse wave signal detected from at least one user. According to another embodiment, the reference bio-signal may be an orthonormal basis obtained by analyzing the frequency of a pulse wave signal detected from the at least one user.

According to another embodiment, the reference bio-signal may be at least one of an orthonormal basis of the partial space established from the valid pulse wave signal, and a covariance matrix and an efficiency matrix of the pulse wave signal. The user identifying apparatus may efficiently store the reference bio-signal by storing the reference bio-signal in the form of the orthonormal basis and the covariance matrix and the efficiency matrix of the pulse wave signal. Accordingly, the number of calculations performed by the user identifying apparatus may be reduced.

The reference bio-signal may include an invalid bio-signal. In this case, when it is determined that the detected bio-signal is valid, the user identifying apparatus may update the reference bio-signal with the detected bio-signal.

In operation S850, the user identifying apparatus may provide a service corresponding to the identified user.

The user identifying apparatus according to an embodiment may provide a service highly likely to be executed by the user or information about the service, based on history information about the identified user.

Figure 9:
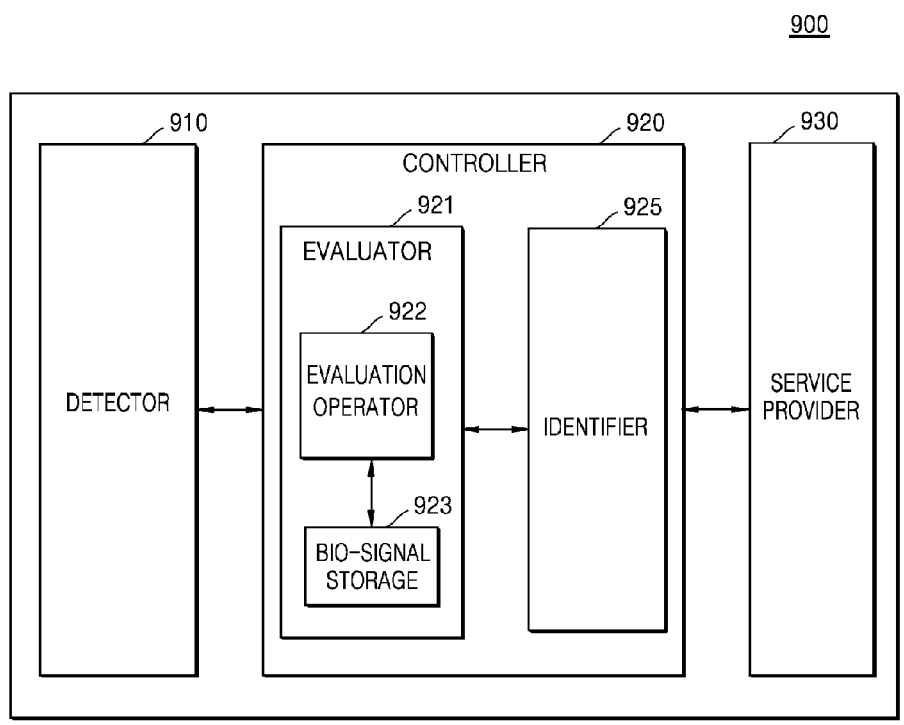
FIGS. 9 and 10 are block diagrams of a user identifying apparatus according to another embodiment.
Figure 10:
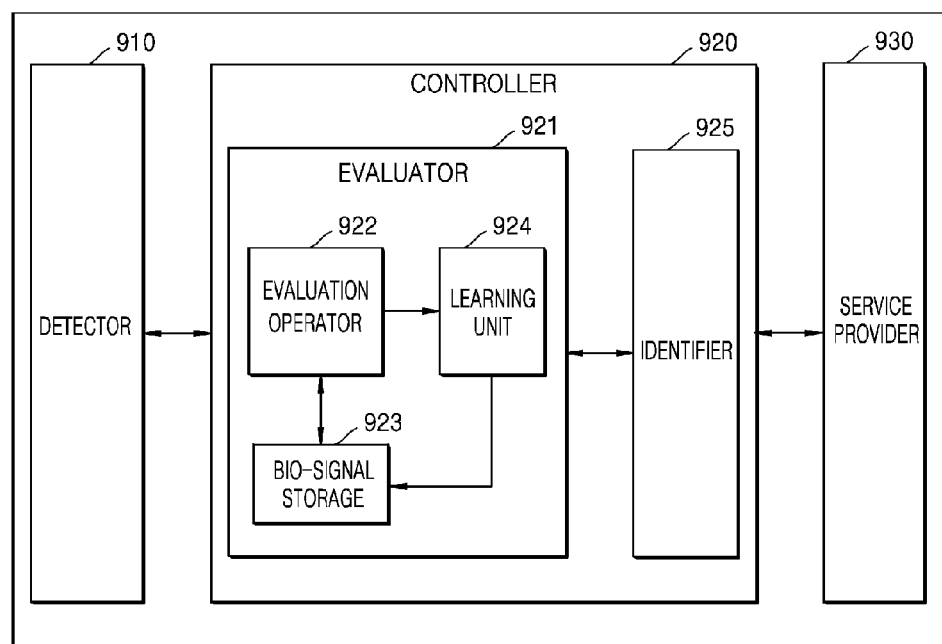

FIGS. 9 and 10 are block diagrams of a user identifying apparatus 900 according to another embodiment.

Referring to FIG. 9, the user identifying apparatus 900 may include a detector 910, a controller 920, and a service provider 930. However, all of the illustrated components are not essential. The user identifying apparatus 900 may be implemented by more or less components than those illustrated in FIGS. 9 and 10.

The aforementioned components will now be described in detail.

The detector 910 according to an embodiment may detect a bio-signal from a user input. For example, the detector 910 may detect a pulse wave signal of a user from the user input.

The controller 920 according to an embodiment may determine whether the detected bio-signal of the user is valid. The controller 920 may identify the user by using the bio-signal determined to be valid.

The controller 920 may include an evaluator 921 and an identifier 925.

The evaluator 921 may determine whether the detected bio-signal of the user is valid. The evaluator 921 according to an embodiment may include an evaluation operator 922 and a bio-signal storage 923.

The evaluation operator 922 may generate a normal bio-signal space by using a reference bio-signal stored in the bio-signal storage 923. The evaluation operator 922 may determine whether the detected bio-signal may be expressed as a primary combination of an orthonormal basis of the normal bio-signal space. For example, the evaluation operator 922 may determine whether the detected bio-signal is valid, by using a value of a loss function calculated based on the orthonormal basis and a detected reference bio-signal.

The bio-signal storage 923 may store a reference bio-signal for each of at least one user. The bio-signal storage 923 may store a previously-obtained bio-signal of the at least one user as a reference bio-signal, together with information about the at least one user.

Referring to FIG. 10, according to another embodiment, the evaluator 921 of the user identifying apparatus 900 may further include a learning unit 924. When it is determined that the detected bio-signal of the user is valid, the learning unit 924 may update the bio-signal stored in the bio-signal storage 923. Accordingly, the bio-signal storage 923 of the user identifying apparatus 900 may accumulate and store valid bio-signals, thereby increasing the accuracy of user identification even when a wrong bio-signal is stored.

When it is determined that the detected bio-signal is valid, the identifier 925 may compare the detected bio-signal with at least one reference bio-signal previously stored in the user identifying apparatus 900.

The identifier 925 may determine a user corresponding to a reference bio-signal that is the most similar to the detected bio-signal, as a user of the detected bio-signal, based on a result of the comparison. For example, the identifier 925 may identify the user by using an independent component analysis or main component analysis technique for the peak waveform of a valid bio-signal. However, this is only an embodiment, and Support Vector Machine (SVM), Linear Discriminant Analysis (LDA), K-Nearest Neighbor (KNN), and Mutual Subspace Method (MSM) may be used to identify the user based on a valid bio-signal.

The service provider 930 may provide a service highly likely to be executed by the user or information about the service, based on history information about the user identified by the controller 930.

Figure 11:
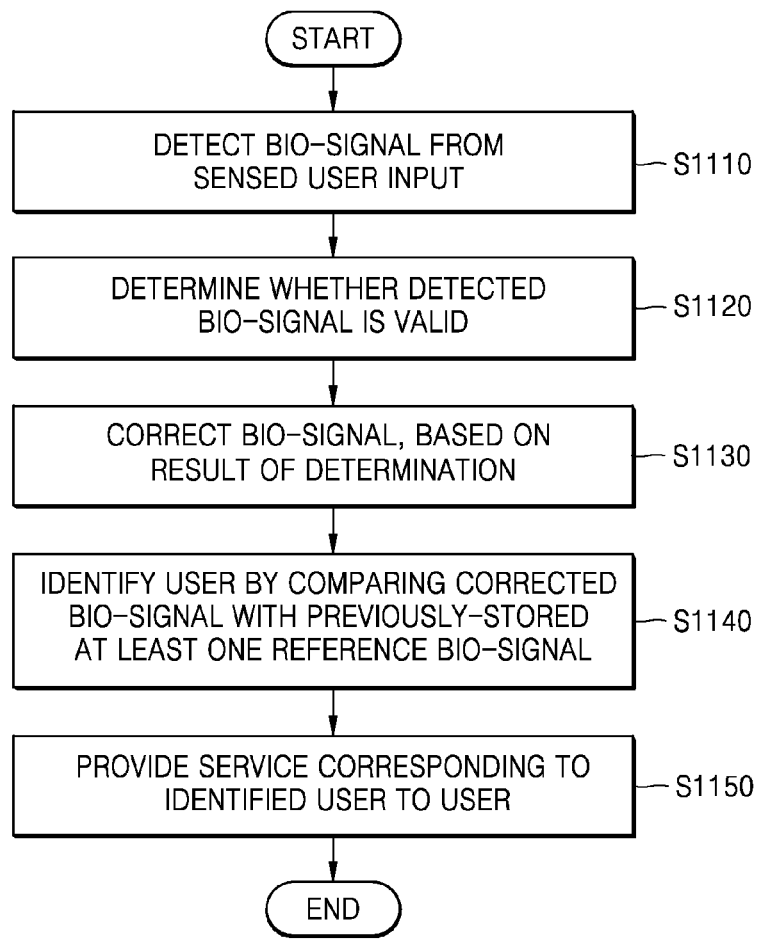
FIG. 11 is a flowchart of a method in which the user identifying apparatus according to an embodiment corrects a detected bio-signal and identifies a user by using a corrected bio-signal.

FIG. 11 is a flowchart of a method in which the user identifying apparatus according to an embodiment corrects a detected bio-signal and identifies a user by using a corrected bio-signal.

In operation S1110, the user identifying apparatus may detect a bio-signal from a user input sensed by the user identifying apparatus.

Operation S1110 may correspond to operation S220 described above with reference to FIG. 2.

In operation S1120, the user identifying apparatus may determine whether the detected bio-signal is valid.

The user identifying apparatus according to an embodiment may determine whether the detected bio-signal is valid, based on whether the detected bio-signal may be expressed as a primary combination of the orthonormal basis of the normal bio-signal space. For example, the user identifying apparatus may calculate the value of a loss function for the detected bio-signal. When the calculated value of the loss function is included in a preset threshold range, the user identifying apparatus may determine whether the detected bio-signal is valid.

In operation S1130, the user identifying apparatus may correct the bio-signal, based on a result of the determination.

For example, when the calculated value of the loss function for the detected bio-signal is less than a first threshold value, the user identifying apparatus may determine that the detected bio-signal is valid. As it is determined that the detected bio-signal is valid, the user identifying apparatus may not correct the bio-signal.

According to another embodiment, when the calculated value of the loss function for the detected bio-signal is equal to or greater than the first threshold value and less than a second threshold value, the user identifying apparatus may correct the detected bio-signal. For example, the user identifying apparatus may perform correction by perpendicularly projecting the detected bio-signal to the normal bio-signal space according to Equation 2 below.

$$\hat{X} \equiv UU^T X \qquad \text{[Equation 2]}$$

In Equation 2, U indicates an orthonormal basis that represents a partial space of a normal bio-signal space. U may be represented as a unique vector corresponding to N unique values having high efficiency matrices calculated from the pre-stored reference bio-signal. $U^T$ indicates a result of a transpose operation performed on U, and x indicates a detected bio-signal.

When an operation of Equation 2 is performed on the detected bio-signal, the user identifying apparatus may remove a component unrelated to the normal bio-signal space from the detected bio-signal.

According to another embodiment, when the calculated value of the loss function for the detected bio-signal is equal to or greater than the second threshold value, the user identifying apparatus may not use the detected bio-signal in user identification.

When a difference between the detected bio-signal and the pre-stored reference bio-signal is less than a certain level, the user identifying apparatus according to an embodiment may correct the detected bio-signal in order to more easily perform the user identification.

In operation S1140, the user identifying apparatus may identify the user by comparing a corrected bio-signal with the previously-stored at least one reference bio-signal.

Operation S1140 may correspond to operation S840 described above with reference to FIG. 8.

In operation S1150, the user identifying apparatus may provide a service corresponding to the identified user to the user.

The user identifying apparatus according to an embodiment may provide a service highly likely to be executed by the user, based on history information about the identified user.

Operation S1150 may correspond to operation S850 described above with reference to FIG. 8.

Figure 12:
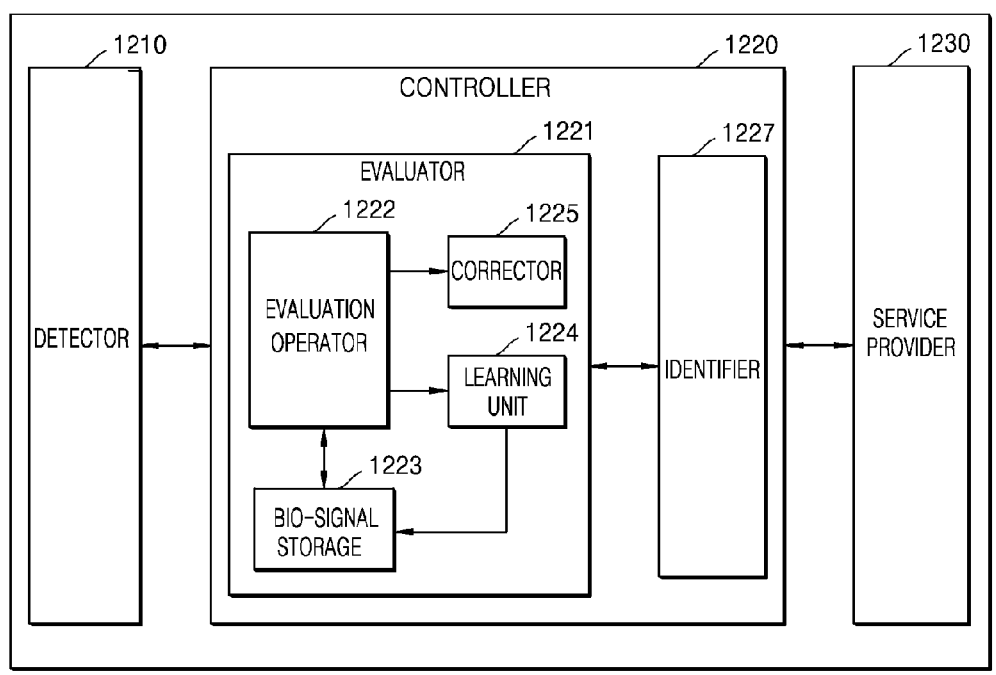
FIG. 12 is a block diagram of a user identifying apparatus according to another embodiment.

FIG. 12 is a block diagram of a user identifying apparatus 1200 according to another embodiment.

Referring to FIG. 12, the user identifying apparatus 1200 may include a detector 1210, a controller 1220, and a service provider 1230. However, all of the illustrated components are not essential. The user identifying apparatus 1200 may be implemented by more or less components than those illustrated in FIG. 12.

The aforementioned components will now be described in detail.

The detector 1210 according to an embodiment may detect a bio-signal from a user input. For example, the detector 1210 may detect a pulse wave signal of a user from the user input.

The controller 1220 according to an embodiment may determine whether the detected bio-signal of the user is valid. The controller 1220 may identify the user by using the bio-signal determined to be valid.

The controller 1220 may include an evaluator 1221 and an identifier 1227.

The evaluator 1221 may determine whether the detected bio-signal of the user is valid. The evaluator 1221 according to an embodiment may include an evaluation operator 1222, a bio-signal storage 1223, a learning unit 1224, and a corrector 1225.

The evaluation operator 1222 may generate a normal bio-signal space by using a reference bio-signal stored in the bio-signal storage 1223. The evaluation operator 1222 may determine whether the detected bio-signal may be expressed as a primary combination of an orthonormal basis of the normal bio-signal space.

For example, the evaluation operator 1222 may determine whether the detected bio-signal is valid, by using a value of a loss function calculated based on the orthonormal basis and a detected reference bio-signal. When the calculated value of the loss function for the detected bio-signal is less than a first threshold value, the evaluation operator 1222 may determine that the detected bio-signal is valid. As it is determined that the detected bio-signal is valid, the evaluation operator 1222 may provide the detected bio-signal to the identifier 1227. Accordingly, when the bio-signal is valid, the user identifying apparatus 1200 may not correct the bio-signal.

According to another embodiment, when the calculated value of the loss function for the detected bio-signal is equal to or greater than the first threshold value and less than a second threshold value, the evaluation operator 1222 may provide the detected bio-signal to the corrector 1225.

The bio-signal storage 1223 may store a reference bio-signal for each of at least one user.

When it is determined that the detected bio-signal of the user is valid, the learning unit 1224 may update a bio-signal stored in the bio-signal storage 1223.

The corrector 1225 may perform correction by perpendicularly projecting the detected bio-signal to the normal bio-signal space.

When it is determined that the detected bio-signal is valid, the identifier 1227 may compare the detected bio-signal with the at least one reference bio-signal previously stored in the user identifying apparatus 1200.

The identifier 1227 may determine a user corresponding to a reference bio-signal that is the most similar to the detected bio-signal, as a user of the detected bio-signal, based on a result of the comparison. The identifier 1227 may correspond to the identifier 925 described above with reference to FIG. 9.

The service provider 1230 may provide a service highly likely to be executed by the user or information about the service, based on history information about the user identified by the controller 1220.

Figure 13A:
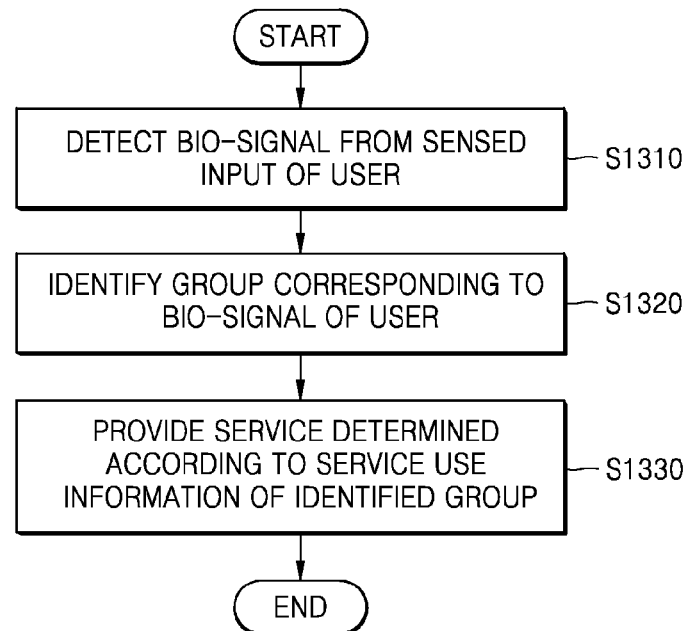
FIG. 13A is a flowchart of a method in which a user identifying apparatus according to an embodiment provides a service corresponding to a group including a user of a detected bio-signal.

FIG. 13A is a flowchart of a method in which the user identifying apparatus according to an embodiment provides a service corresponding to a group including a user of a detected bio-signal.

In operation S1310, the user identifying apparatus may detect a bio-signal from a sensed input of a user.

Operation S1310 may correspond to operation S210 described above with reference to FIG. 2.

In operation S1320, the user identifying apparatus may identify a group corresponding to the bio-signal of the user.

The user identifying apparatus according to an embodiment may determine whether the detected bio-signal is valid. For example, the user identifying apparatus may determine whether the detected bio-signal is valid, by determining whether obtained status information corresponds to a preset detection criterion. According to another embodiment, the user identifying apparatus may determine whether the detected bio-signal is valid, by calculating a loss function value of the detected bio-signal, based on the pre-stored reference bio-signal.

When it is determined that the detected bio-signal is valid, the user identifying apparatus according to an embodiment may compare the detected bio-signal with a pre-stored reference bio-signal for each group. Groups may be classified based on the genders and ages of users.

For example, the user identifying apparatus may compare waveform data for reference bio-signals of groups A-G with the detected bio-signal. The user identifying apparatus may select a group in which an inter-vector distance for a peak waveform amplitude of the detected bio-signal is minimum from among the respective reference bio-signals of the groups A-G. However, this is only an embodiment, and a feature amount other than the amplitude of a peak waveform may be compared. For example, the user identifying apparatus may select a group including the user, by using an identification technique, such as Independent Component Analysis (ICA), Support Vector Machine (SVM), Principal Component Analysis (PCA), Linear Discriminant Analysis (LDA), K-Nearest Neighbor (KNN), or a Mutual Subspace Method (MSM).

In operation S1330, the user identifying apparatus may provide a service determined according to service use information of an identified group.

When the user identifying apparatus according to an embodiment is a TV remote controller, the user identifying apparatus may provide the user with channel history information, broadcasting preference information, and the like of the group including the user.

Because the user identifying apparatus according to an embodiment stores history information about which service a user belonging to a specific group previously received using the user identifying apparatus, the user identifying apparatus may provide a user-customized service based on the history information. For example, when the user identifying apparatus is a TV remote controller, the user identifying apparatus may selectively suggest information, such as a menu screen or a voice guide of a TV, to each group. For example, when groups are classified according to ages, such as youngsters, middle ages, and seniors, the user identifying apparatus may select a TV manipulation history or a program watch history of each group and provide the selected TV manipulation history or program watch history to the user. Moreover, the user identifying apparatus may provide a service to the user, in consideration of hobbies, preferences, or remote controller manipulation skill levels of users.

Figure 13B:
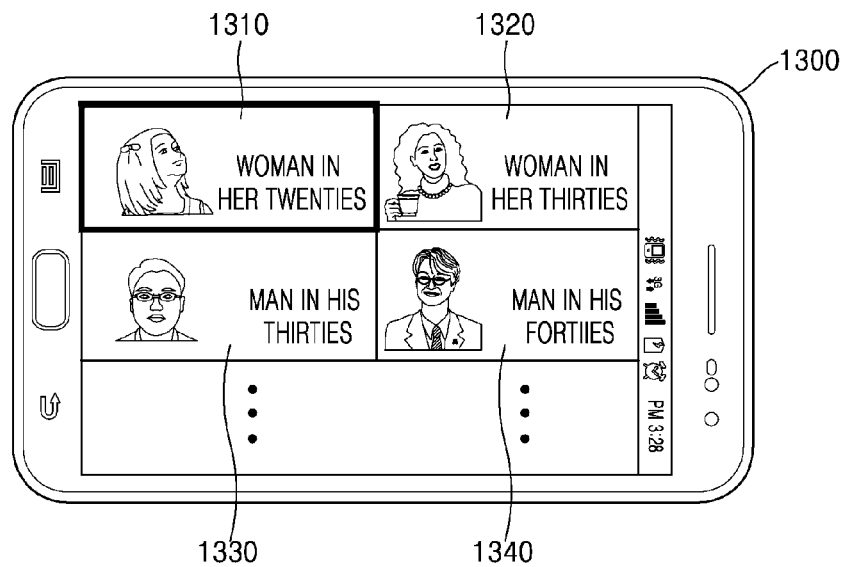
FIG. 13B is a flowchart of a method in which a user identifying apparatus according to an embodiment provides a service corresponding to a group including a user of a detected bio-signal.

FIG. 13B is a diagram for explaining a method in which a user identifying apparatus 1300 according to an embodiment provides a service corresponding to a group including a user of a detected bio-signal.

The user identifying apparatus 1300 may detect a bio-signal of a user from a sensed input of the user. The user identifying apparatus 1300 may identify a group corresponding to the bio-signal of the user.

The user identifying apparatus 1300 may determine whether the detected bio-signal is valid. When it is determined that the detected bio-signal is valid, the user identifying apparatus 1300 may compare the detected bio-signal with a pre-stored reference bio-signal for each group. Groups may be classified based on the genders and ages of users.

For example, the user identifying apparatus 1300 may compare waveform data for respective reference bio-signals of a group A 1310, a group B 1320, a group C 1330, and a group D 1340 with the detected bio-signal. Information about the group A 1310, the group B 1320, the group C 1330, and the group D 1340 may be displayed on an output unit of the user identifying apparatus 1300.

The user identifying apparatus according to an embodiment may select the group A 1310 in which an inter-vector distance for a peak waveform amplitude of the detected bio-signal is minimum from among the respective reference bio-signals of the groups A-D. However, this is only an embodiment, and a feature amount other than the amplitude of a peak waveform may be compared. In order for the user to check that the group A 1310 has been selected, the user identifying apparatus may display an identifier enabling the user to identify the selected group A 1310, by, for example, highlighting a thumbnail image of the group A 1310.

Figure 14A:
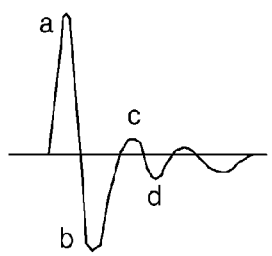
FIGS. 14A and 14B are graphs for explaining a bio-signal detected by a user identifying apparatus according to an embodiment and a reference bio-signal for each group previously stored in the user identifying apparatus.
Figure 14B:
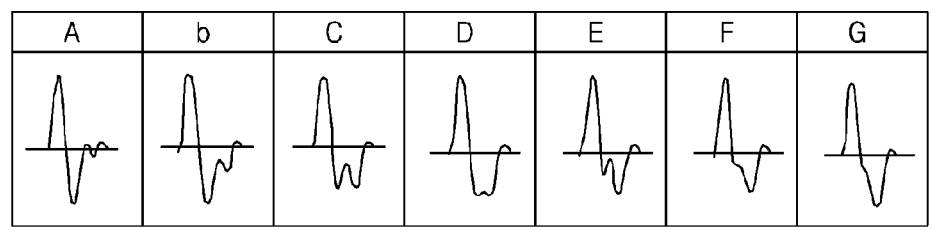

FIGS. 14A and 14B are graphs for explaining a bio-signal detected by the user identifying apparatus according to an embodiment and a reference bio-signal for each group previously stored in the user identifying apparatus.

Referring to FIG. 14A, the user identifying apparatus may check the heights of points a, b, c and d corresponding to inflection points from the detected bio-signal.

FIG. 14B illustrates respective reference bio-signals of seven groups. The user identifying apparatus may classify waveforms into seven groups in a descending order of a value of (−b/a). A high value (−b/a) indicates a status having no artery hardening and a low value (−b/a) indicates a status having artery hardening. In other words, it may be seen that the age increases in a direction from the group A to the group G.

Figure 15:
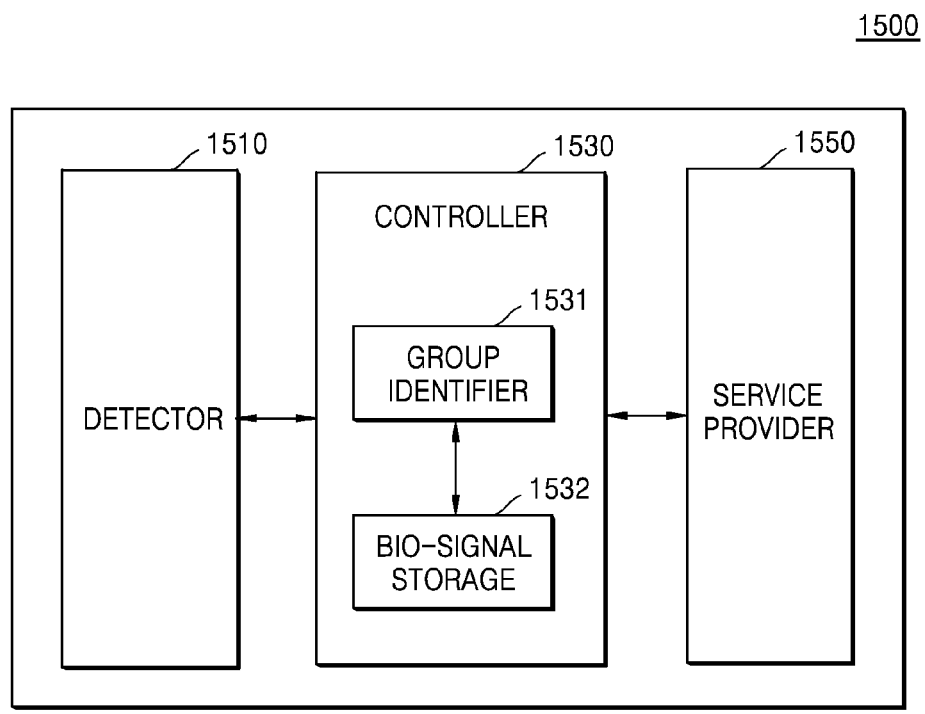
FIGS. 15 and 16 are block diagrams of a user identifying apparatus according to another embodiment.
Figure 16:
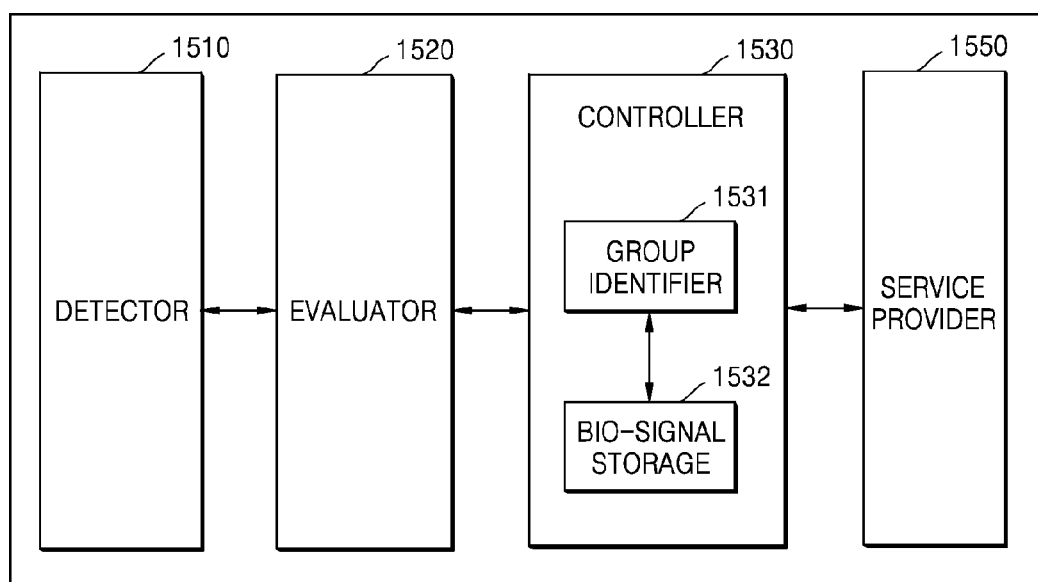

FIGS. 15 and 16 are block diagrams of a user identifying apparatus 1500 according to another embodiment.

Referring to FIG. 15, the user identifying apparatus 1500 may include a detector 1510, a controller 1530, and a service provider 1550. However, all of the illustrated components are not essential. The user identifying apparatus 1500 may be implemented by more or less components than those illustrated in FIG. 15.

For example, referring to FIG. 16, the user identifying apparatus 1500 may further include an evaluator 1520 in addition to the detector 1510, the controller 1530, and the service provider 1550.

The aforementioned components will now be described in detail.

The detector 1510 according to an embodiment may detect a bio-signal of a user from a user input. For example, the detector 1510 may detect a pulse wave signal of the user from the user input.

The evaluator 1520 may determine whether the detected bio-signal is valid. For example, the evaluator 1520 may determine whether the detected bio-signal is valid, by determining whether status information obtained at the moment when the user input is sensed corresponds to a preset detection criterion. According to another embodiment, the evaluator 1520 may determine whether the detected bio-signal is valid, by calculating a loss function value of the detected bio-signal, based on a pre-stored reference bio-signal.

The controller 1530 according to an embodiment may identify the user by using the detected bio-signal of the user.

The controller 1530 may include a group identifier 1531 and a bio-signal storage 1532.

The group identifier 1531 according to an embodiment may compare the detected bio-signal with a pre-stored reference bio-signal for each group. Groups may be classified based on the genders and ages of users.

For example, the group identifier 1531 may read out waveform data for reference bio-signals of groups A-G and compare the read-out waveform data with the detected bio-signal. However, this is only an embodiment, and a feature amount other than the amplitude of a peak waveform may be compared. For example, the group identifier 1531 may select a group including the user by using an identifying technique, such as ICA, SVM, PCA, LDA, KNN, or MSM.

The bio-signal storage 1532 may store at least one of a reference bio-signal for each group classified based on genders or ages and a feature amount of the reference bio-signal. When the bio-signal storage 1532 according to an embodiment stores the feature amount of the reference bio-signal for each group, the group identifier 1531 may identify the group including the user without extracting a feature amount of the bio-signal from the reference bio-signal. The bio-signal storage 1532 may reduce the capacity of memory necessary for storage by storing the feature amount of the reference bio-signal instead of the entire reference bio-signal.

The service provider 1550 may provide a service highly likely to be executed by the user or information about the service, based on history information about the user identified by the controller 1530.

Figure 17:
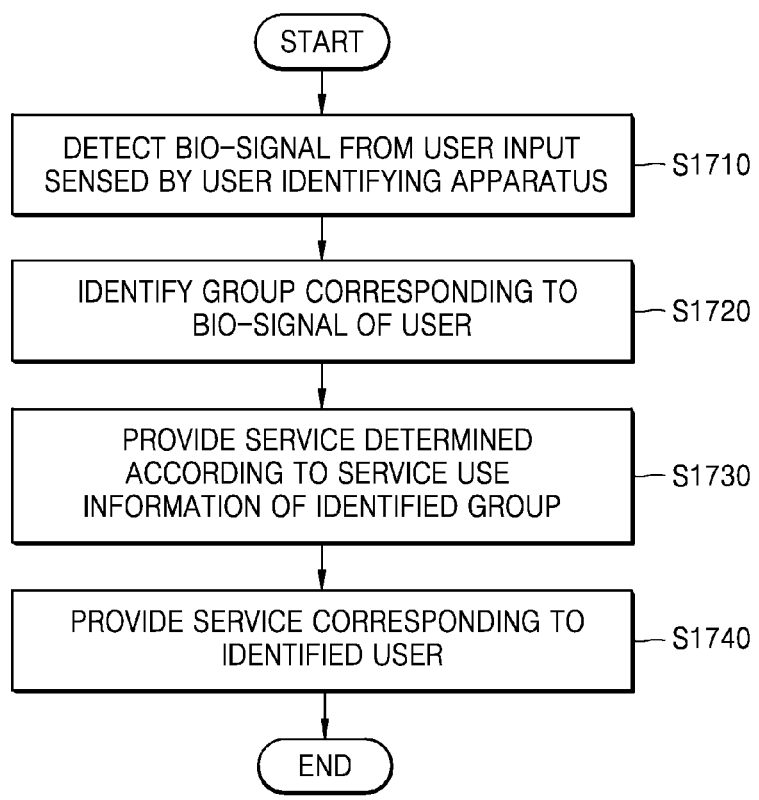
FIG. 17 is a flowchart of a method in which a user identifying apparatus according to an embodiment detects a bio-signal of a user, determines a group including the user, and then identifies the user from the determined group.

FIG. 17 is a flowchart of a method in which the user identifying apparatus according to an embodiment detects a bio-signal of a user, determines a group including the user, and then identifies the user from the determined group.

In operation S1710, the user identifying apparatus may detect a bio-signal from a user input sensed by the user identifying apparatus.

Operation S1710 may correspond to operation S220 described above with reference to FIG. 2.

In operation S1720, the user identifying apparatus may identify a group corresponding to the bio-signal of the user.

The user identifying apparatus according to an embodiment may compare the detected bio-signal with a pre-stored reference bio-signal for each group. Groups may be classified based on the genders and ages of users. The user identifying apparatus may select a group corresponding to a reference bio-signal that is the most similar to characteristics of the detected bio-signal, based on a result of the comparison.

Operation S1720 may correspond to operation S1320 described above with reference to FIG. 13.

In operation S1730, the user identifying apparatus may identify the user by comparing the bio-signal of the user with a reference bio-signal included in the identified group.

The user identifying apparatus according to an embodiment may compare the bio-signal of the user with a reference bio-signal of at least one user included in the identified group. For example, the user identifying apparatus may compare feature amounts of the reference bio-signal of the at least one user, such as a peak waveform period, an inflection point, and a waveform magnitude thereof, with those of the detected bio-signal.

The user identifying apparatus according to an embodiment may identify a user of a reference bio-signal that is the most similar to the detected bio-signal, as the user of the detected bio-signal, based on a result of the comparison.

The user identifying apparatus according to an embodiment preferentially selects a group highly likely to include the user, and then compares a detailed feature amount of a reference bio-signal included in the selected group with that of the detected bio-signal, thereby reducing the number of calculations necessary for user identification. When reference bio-signals included in the selected group are very similar to each other, the user identifying apparatus may identify the user by using an identifying technique specialized for the reference bio-signals included in the selected group.

In operation S1740, the user identifying apparatus may provide a service corresponding to the identified user.

The user identifying apparatus according to an embodiment may provide the user with a service highly likely to be executed by the user, based on history information about the identified user. For example, when the user identifying apparatus is a remote controller, a service provider may control a TV to display information about TV channels frequently watched by the user.

Figure 18:
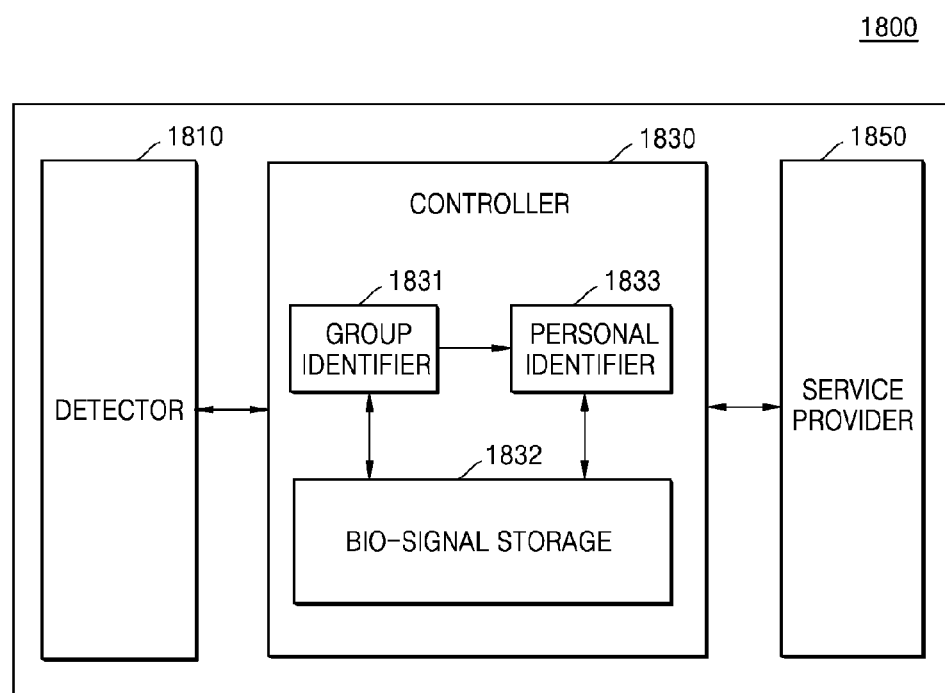
FIGS. 18 and 19 are block diagrams of a user identifying apparatus according to another embodiment.
Figure 19:
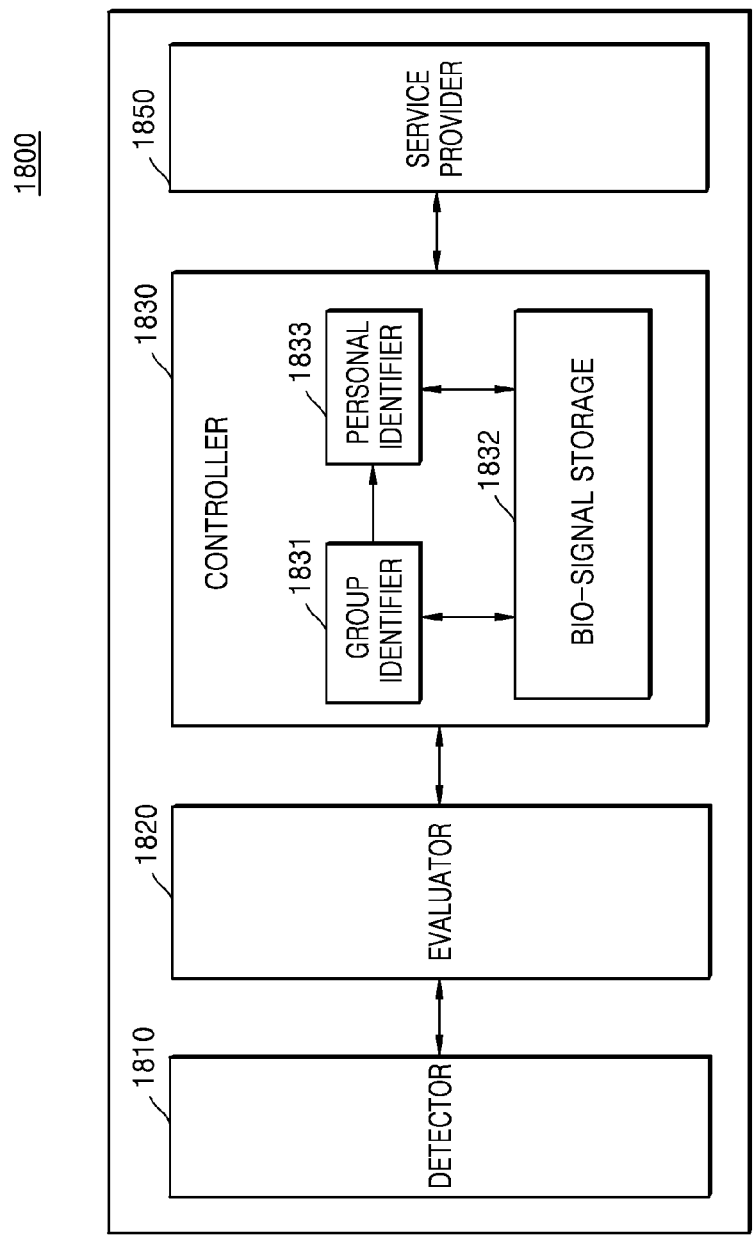

FIGS. 18 and 19 are block diagrams of a user identifying apparatus 1800 according to another embodiment.

Referring to FIG. 18, the user identifying apparatus 1800 may include a detector 1810, a controller 1830, and a service provider 1850. However, all of the illustrated components are not essential. The user identifying apparatus 1800 may be implemented by more or less components than those illustrated in FIGS. 18 and 19.

For example, referring to FIG. 19, the user identifying apparatus 1800 may further include an evaluator 1820 in addition to the detector 1810, the controller 1830, and the service provider 1850.

The aforementioned components will now be described in detail.

The detector 1810 according to an embodiment may detect a bio-signal of a user from a user input. For example, the detector 1810 may detect a pulse wave signal of the user from the user input.

The evaluator 1820 may determine whether the detected bio-signal is valid. For example, the evaluator 1820 may determine whether the detected bio-signal is valid, by determining whether status information obtained at the moment when the user input is sensed corresponds to a preset detection criterion. According to another embodiment, the evaluator 1820 may determine whether the detected bio-signal is valid, by calculating a loss function value of the detected bio-signal, based on a pre-stored reference bio-signal.

The controller 1830 according to an embodiment may identify the user by using the detected bio-signal of the user.

The controller 1830 may include a group identifier 1831, a bio-signal storage 1832, and a personal identifier 1833.

The group identifier 1831 according to an embodiment may compare the detected bio-signal with a pre-stored reference bio-signal for each group. Groups may be classified based on the genders and ages of users.

For example, the group identifier 1831 may read out waveform data for reference bio-signals of groups A-G and compare the read-out waveform data with the detected bio-signal. However, this is only an embodiment, and a feature amount other than the amplitude of a peak waveform may be compared. For example, the group identifier 1831 may select a group including the user by using an identifying technique, such as ICA, SVM, PCA, LDA, KNN, or MSM.

The bio-signal storage 1832 may store at least one of a reference bio-signal for each group classified based on genders or ages and a feature amount of the reference bio-signal. When the bio-signal storage 1832 according to an embodiment stores the feature amount of the reference bio-signal for each group, the group identifier 1831 may identify the group including the user without extracting a feature amount of the bio-signal from the reference bio-signal.

The personal identifier 1833 may identify the user by comparing the bio-signal of the user with a reference bio-signal included in the identified group. The personal identifier 1833 according to an embodiment may compare the bio-signal of the user with a reference bio-signal of at least one user included in the identified group. The personal identifier 1833 may identify a user of a reference bio-signal that is the most similar to the detected bio-signal, as the user of the detected bio-signal, based on a result of the comparison.

The service provider 1850 may provide a service highly likely to be executed by the user or information about the service, based on history information about the user identified by the controller 1830.

Figure 20:
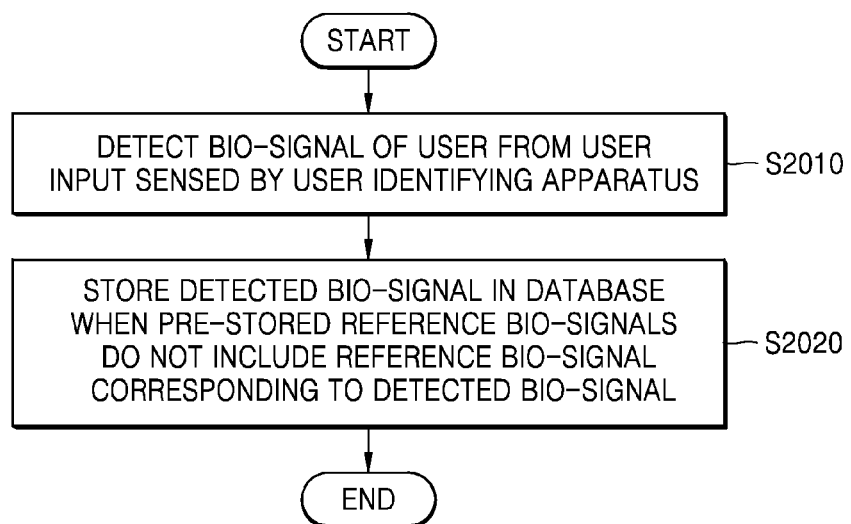
FIG. 20 is a flowchart of a method in which a user identifying apparatus according to an embodiment stores a detected bio-signal in a database.

FIG. 20 is a flowchart of a method in which a user identifying apparatus according to an embodiment stores a detected bio-signal in a database.

In operation S2010, the user identifying apparatus may detect a bio-signal of a user from a sensed user input.

Operation S2010 may correspond to operation S220 described above with reference to FIG. 2.

In operation S2020, the user identifying apparatus may store the detected bio-signal in the database when pre-stored reference bio-signals do not include a reference bio-signal corresponding to the detected bio-signal.

The user identifying apparatus according to an embodiment may determine whether the detected bio-signal corresponds to a pre-stored reference bio-signal. When a reference bio-signal corresponding to the detected bio-signal exists, the user identifying apparatus may identify the user by using the detected bio-signal.

On the other hand, when pre-stored reference bio-signals do not include the reference bio-signal corresponding to the detected bio-signal, the user identifying apparatus may store the detected bio-signal in the database. The user identifying apparatus may store the detected bio-signal and information about the user together. For example, as it is determined that no reference bio-signals corresponding to the detected bio-signal exist, the user identifying apparatus may provide a user interface capable of inputting the information about the user.

Figure 21:
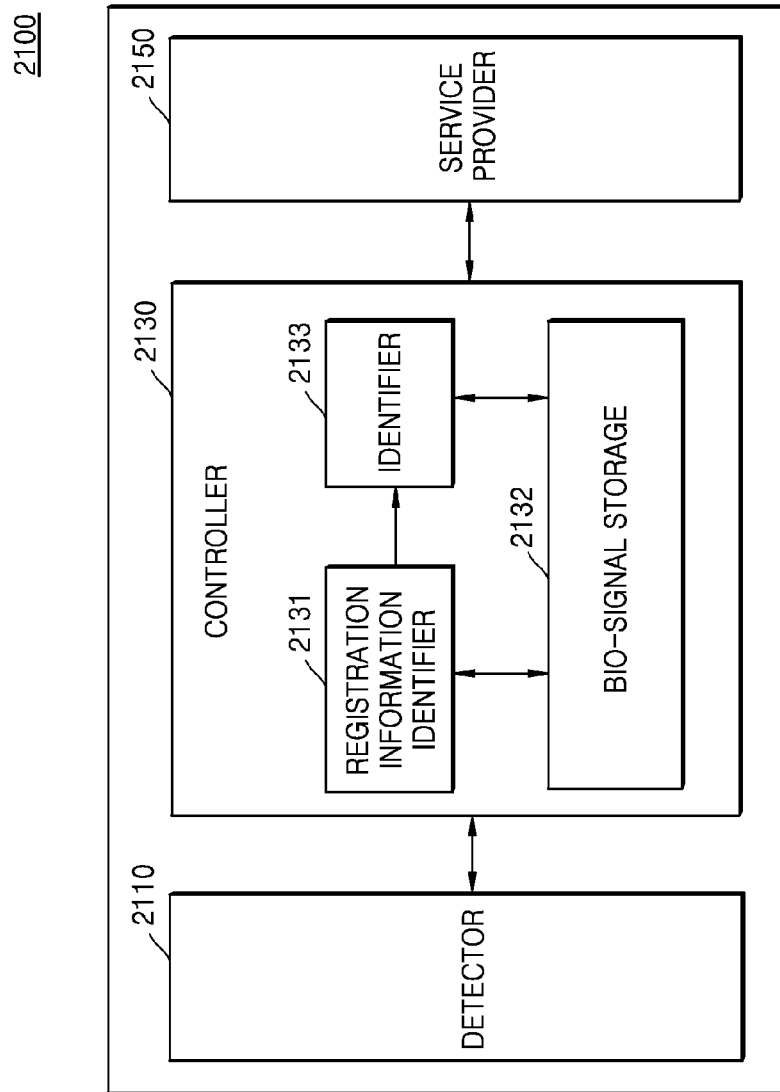
FIGS. 21 and 22 are block diagrams of a user identifying apparatus according to another embodiment.
Figure 22:
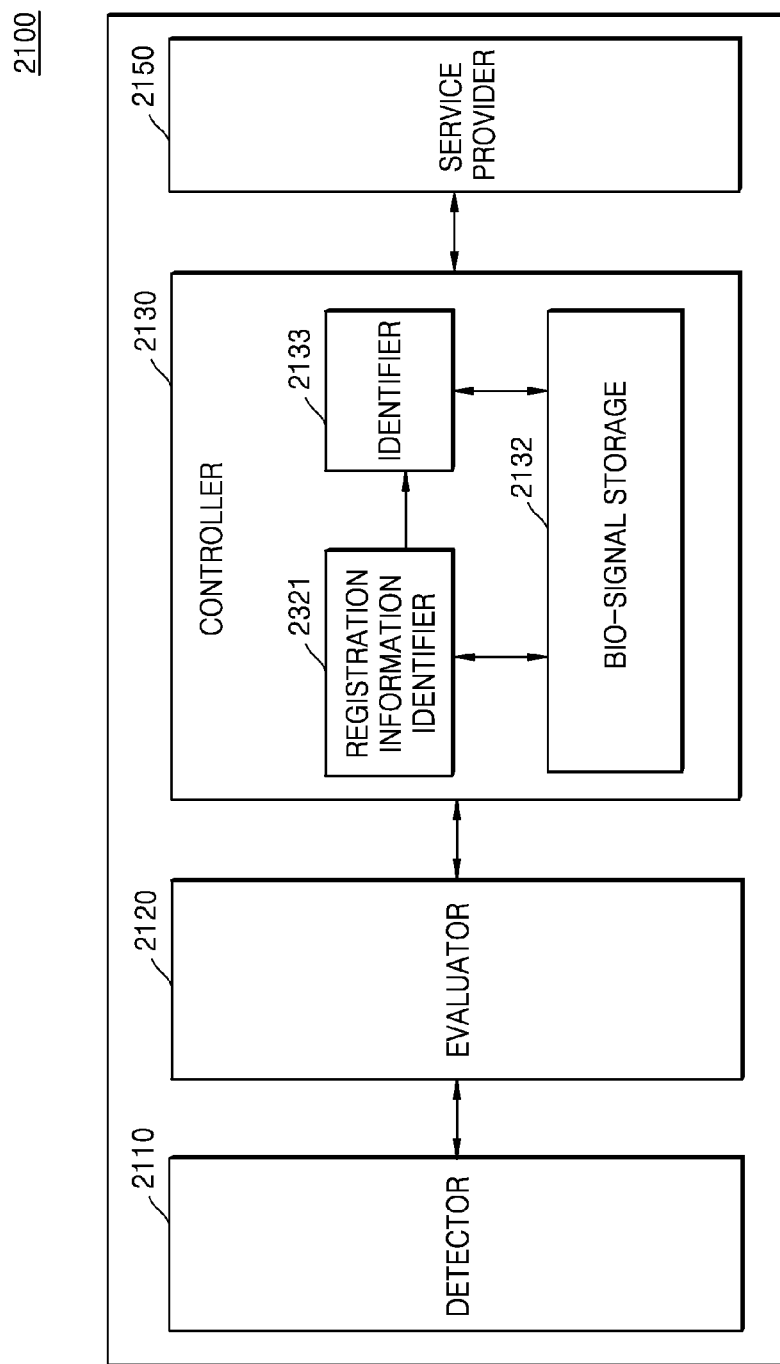

FIGS. 21 and 22 are block diagrams of a user identifying apparatus 2100 according to another embodiment.

Referring to FIG. 21, the user identifying apparatus 2100 may include a detector 2110, a controller 2130, and a service provider 2150. However, all of the illustrated components are not essential. The user identifying apparatus 2100 may be implemented by more or less components than those illustrated in FIGS. 21 and 22.

For example, referring to FIG. 22, the user identifying apparatus 2100 may further include an evaluator 2120 in addition to the detector 2110, the controller 2130, and the service provider 2150.

The aforementioned components will now be described in detail.

The detector 2110 according to an embodiment may detect a bio-signal of a user from a user input. For example, the detector 2110 may detect a pulse wave signal of the user from the user input.

The evaluator 2120 may determine whether the detected bio-signal is valid. For example, the evaluator 2120 may determine whether the detected bio-signal is valid, by determining whether status information obtained at the moment when the user input is sensed corresponds to a preset detection criterion. According to another embodiment, the evaluator 2120 may determine whether the detected bio-signal is valid, by calculating a loss function value of the detected bio-signal, based on a pre-stored reference bio-signal.

The controller 2130 according to an embodiment may identify the user by using the detected bio-signal of the user.

The controller 2130 may include a registration information identifier 2131, a bio-signal storage 2132, and an identifier 2133.

The registration information identifier 2131 according to an embodiment may determine whether the detected bio-signal corresponds to a reference bio-signal previously stored in the bio-signal storage 2132. When pre-stored reference bio-signals do not include the reference bio-signal corresponding to the detected bio-signal, the registration information identifier 2131 may store the detected bio-signal in the bio-signal storage 2132. The registration information identifier 2131 may store the detected bio-signal and information about the user together.

The bio-signal storage 2132 may store at least one of a reference bio-signal of at least one user and a feature amount of the reference bio-signal.

The identifier 2133 may identify the user by comparing the detected bio-signal with the pre-stored reference bio-signals.

The service provider 2150 may provide a service highly likely to be executed by the user or information about the service, based on history information about the user identified by the controller 2130.

Figure 23:
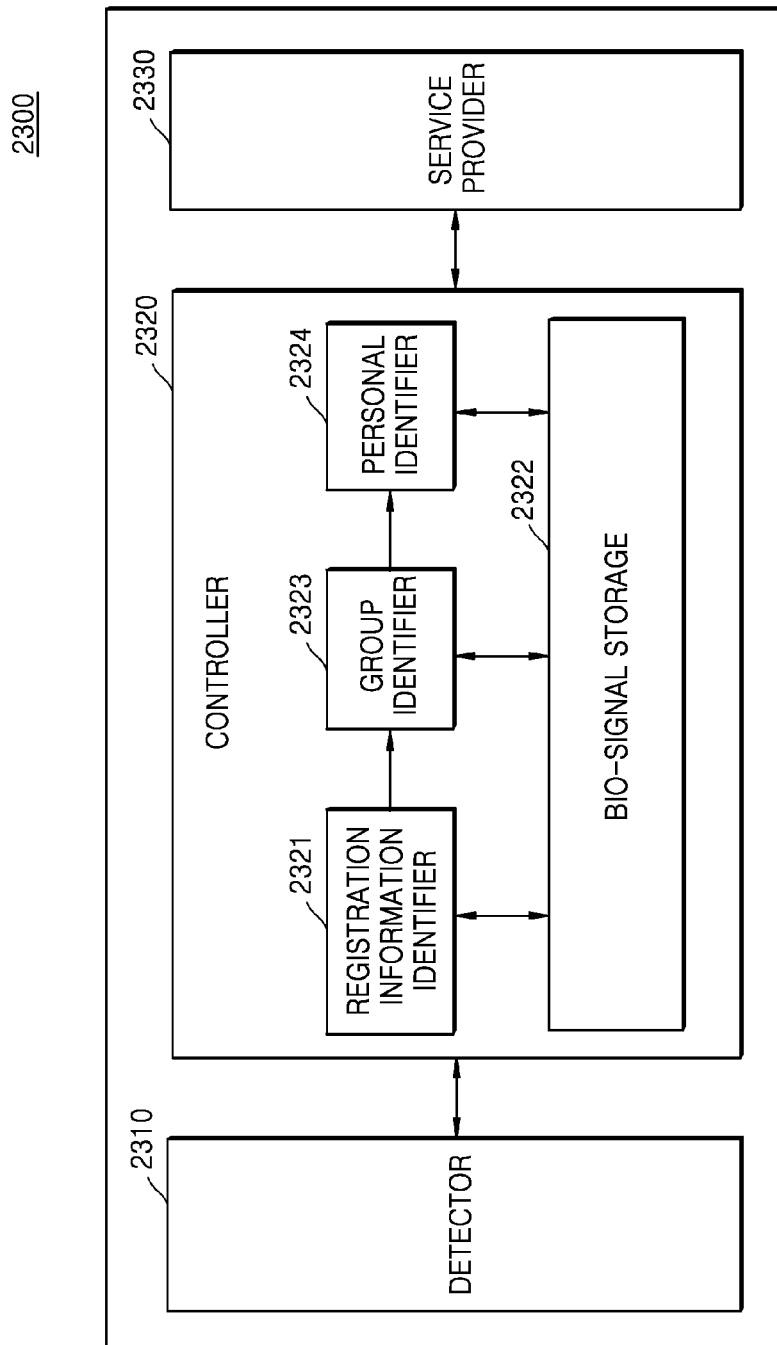
FIG. 23 is a block diagram of a user identifying apparatus according to another embodiment.

FIG. 23 is a block diagram of a user identifying apparatus 2300 according to another embodiment.

Referring to FIG. 23, the user identifying apparatus 2300 may include a detector 2310, a controller 2320, and a service provider 2330. However, all of the illustrated components are not essential. The user identifying apparatus 2300 may be implemented by more or less components than those illustrated in FIG. 23.

The aforementioned components will now be described in detail.

The detector 2310 according to an embodiment may detect a bio-signal of a user from a user input. For example, the detector 2310 may detect a pulse wave signal of the user from the user input.

The controller 2320 may identify the user by using the detected bio-signal of the user.

The controller 2320 may include a registration information identifier 2321, a bio-signal storage 2322, a group identifier 2323, and a personal identifier 2324.

The registration information identifier 2321 according to an embodiment may determine whether the detected bio-signal corresponds to a reference bio-signal previously stored in the bio-signal storage 2322. When pre-stored reference bio-signals do not include the reference bio-signal corresponding to the detected bio-signal, the registration information identifier 2321 may store the detected bio-signal in the bio-signal storage 2322. The registration information identifier 2321 may store the detected bio-signal and information about the user together.

The bio-signal storage 2322 may store at least one of a reference bio-signal of at least one user and a feature amount of the reference bio-signal.

The group identifier 2323 may compare the detected bio-signal with a pre-stored reference bio-signal for each group. Groups may be classified based on the genders and ages of users.

For example, the user identifying apparatus may read waveform data for reference bio-signals of groups A-G and compare the read-out waveform data with the detected bio-signal. However, this is only an embodiment, and a feature amount other than the amplitude of a peak waveform may be compared. For example, the user identifying apparatus may select a group including the user by using an identifying technique, such as ICA, SVM, PCA, LDA, KNN, or MSM.

The personal identifier 2324 may identify the user by comparing the bio-signal of the user with a reference bio-signal included in the identified group. The personal identifier 2324 according to an embodiment may compare the bio-signal of the user with a reference bio-signal of at least one user included in the identified group. The personal identifier 2324 may identify a user of a reference bio-signal that is the most similar to the detected bio-signal, as the user of the detected bio-signal, based on a result of the comparison.

The service provider 2330 may provide a service highly likely to be executed by the user or information about the service, based on history information about the user identified by the controller 2320.

A method according to an embodiment of the present invention may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present invention or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

An apparatus according to an embodiment may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributive manner. This media can be read by the computer, stored in the memory, and executed by the processor.

Reference has been made to the exemplary embodiments illustrated in the drawings, and specific language has been used to describe these embodiments. However, no limitation of the scope of the inventive concept is intended by this specific language, and exemplary embodiments should be construed to encompass all exemplary embodiments that would normally occur to one of ordinary skill in the art.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Embodiments may also employ cores of the same kind or different kinds, different kinds of CPUs, etc. Similarly, where the elements are implemented using software programming or software elements, the embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

The use of the terms "a" and "an" and "the" and similar referents in the context of the description of the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments of the present invention are not limited to the described order of the operations. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The invention claimed is:

1. A user identifying method using a bio-signal, the user identifying method comprising:
   detecting a user input;
   detecting, by at least one processor, a bio-signal from the detected user input;
   obtaining, by the at least one processor, status information representing a body status of a user at a moment when the user input is obtained;
   identifying, by the at least one processor, a validity of the detected bio-signal based on whether the status information corresponds to a preset detection criterion of the body status of the user, the status information comprising at least one from among a body temperature of the user, a posture of the user, or a combination of the posture and a motion of the user;
   identifying, by the at least one processor, based on a result of the identifying the validity, a group corresponding to the bio-signal of the user from among a plurality of groups classified based on characteristics of reference bio-signals, and
   identifying, by the at least one processor, the user by analyzing the bio-signal based on characteristics specialized for the identified group.

2. The user identifying method of claim 1, wherein the bio-signal comprises a pulse wave signal.

3. The user identifying method of claim 1, wherein the user identifying method further comprises displaying information about the identified group.

4. The user identifying method of claim 1, wherein the identifying of the user further comprises comparing a reference bio-signal included in the identified group with the bio-signal of the user.

5. The user identifying method of claim 1, further comprising:
   obtaining service use information of the identified group from among service use information of the plurality of groups that represents history information of a service previously executed by a user included in the identified group; and
   providing a service based on the obtained service use information.

6. The user identifying method of claim 1, further comprising creating a normal bio-signal space that represents characteristics of the at least one reference bio-signal based on vector information of the at least one reference bio-signal,
   wherein the identifying comprises identifying whether the bio-signal is valid, based on a degree to which the bio-signal is deformed as the bio-signal is projected to the normal bio-signal space.

7. The user identifying method of claim 6, further comprising, when the degree to which the bio-signal is deformed is within a preset range, correcting the bio-signal.

8. The user identifying method of claim 1, wherein the identifying comprises:
   measuring a value of the at least one from among the body temperature of the user, the posture of the user, or the combination of the posture and the motion of the user;
   comparing the measured value to a preset value; and
   identifying that the bio-signal is valid in response to the measured value corresponding to the preset value.

9. The user identifying method of claim 1, wherein the identifying the user comprises selecting a valid bio-signal from among a plurality of detected bio-signals and comparing the selected bio-signal with the at least one pre-stored reference bio-signal.

10. The user identifying method of claim 1, wherein the status information is obtained with at least one of a gyroscopic sensor, an acceleration sensor, and a digital compass.

11. A user identifying apparatus using a bio-signal, comprising:
    a sensor configured to detect a user input; and
    at least one processor configured:
    to detect a bio-signal from the detected user input,
    to obtain status information representing a body status of a user at a moment when the user input is obtained, the status information comprising at least one from among a body temperature of the user, a posture of the user, or a combination of the posture and a motion of the user,
    to identify a validity of the detected bio-signal based on whether the status information corresponds to a preset detection criterion of the body status of the user,
    to identify, based on a result of the identifying the validity, a group corresponding to the bio-signal of the user from among a plurality of groups classified based on characteristics of reference bio-signals and
    to identify the user by analyzing the bio-signal based on characteristics specialized for the identified group.

12. The user identifying apparatus of claim 11, wherein the user identifying apparatus further comprises an output unit configured to display information about the identified group.

13. The user identifying apparatus of claim 11, wherein the at least one processor is further configured to compare a reference bio-signal included in the identified group with the bio-signal of the user.

14. The user identifying apparatus of claim 11, wherein the at least one processor is further configured to obtain service use information of the identified group from among service use information of the plurality of groups that represents history information of a service previously executed by a user included in the identified group and to provide a service based on the obtained service use information.

15. The user identifying apparatus of claim 11, wherein the at least one processor is further configured to create a normal bio-signal space that represents characteristics of the at least one reference bio-signal based on vector information of the at least one reference bio-signal, and to identify whether the bio-signal is valid, based on a degree to which the bio-signal is deformed as the bio-signal is projected to the normal bio-signal space.

16. The user identifying apparatus of claim 11, wherein, when a degree to which the bio-signal is deformed is within a preset range, the at least one processor is further configured to correct the bio-signal.

17. The user identifying apparatus of claim 11, wherein the at least one processor is further configured to:
    measure a value of the at least one from among the body temperature of the user, the posture of the user, or the combination of the posture and the motion of the user;
    compare the measured value to a preset value; and
    identify that the bio-signal is valid in response to the measured value corresponding to the preset value.

18. The user identifying apparatus of claim 11, wherein the bio-signal comprises a pulse wave signal.

19. The user identifying apparatus of claim 11, wherein the sensor comprises at least one of a gyroscopic sensor, an acceleration sensor, or a digital compass and the at least one processor is further configured to control the sensor to obtain the status information.

* * * * *